United States Patent [19]

Reddig et al.

[11] Patent Number: 5,342,927

[45] Date of Patent: Aug. 30, 1994

[54] REACTIVE DYESTUFFS FOR THE DYEING AND PRINTING OF HYDROXYL-OR AMINO-CONTAINING MATERIALS

[75] Inventors: Wolfram Reddig, Bergisch Gladbach; Karl-Josef Herd, Odenthal-Holz, both of Fed. Rep. of Germany

[73] Assignee: Bayer Aktiengesellschaft, Leverkusen, Fed. Rep. of Germany

[21] Appl. No.: 917,548

[22] Filed: Jul. 21, 1992

[30] Foreign Application Priority Data

Jul. 31, 1991 [DE] Fed. Rep. of Germany ....... 4125266

[51] Int. Cl.$^5$ .................. C09B 62/002; C09B 62/022; D06P 1/382
[52] U.S. Cl. .................... 534/618; 534/605; 534/606; 534/612; 534/617; 534/624; 534/633; 534/634; 540/125; 540/126; 544/75; 544/76; 544/122; 544/187; 544/189; 544/193.1; 544/209; 544/238; 544/294; 544/295; 544/296
[58] Field of Search ............... 534/605, 606, 612, 617, 534/618, 624, 633, 634; 540/125, 126; 544/75, 76, 122, 187, 189, 193.1, 209, 238, 294–296

[56] References Cited

U.S. PATENT DOCUMENTS

| | | | |
|---|---|---|---|
| 3,669,951 | 6/1972 | Bien et al. | 534/627 |
| 4,560,388 | 12/1985 | Rohrer | 534/634 X |
| 4,631,065 | 12/1986 | Seitz et al. | 534/634 X |
| 4,638,054 | 1/1987 | Herd et al. | 534/634 X |
| 4,647,286 | 3/1987 | Seitz | 534/634 X |
| 4,748,236 | 5/1988 | Jager et al. | 534/634 X |

FOREIGN PATENT DOCUMENTS

| | | | |
|---|---|---|---|
| 3502104 | 7/1986 | Fed. Rep. of Germany | 534/634 |
| 4005121 | 8/1991 | Fed. Rep. of Germany | 534/634 |

*Primary Examiner*—Robert W. Ramsuer
*Assistant Examiner*—Fiona T. Powers
*Attorney, Agent, or Firm*—Sprung Horn Kramer & Woods

[57] ABSTRACT

Reactive dyestuffs of the formula

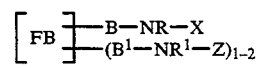

in which X is

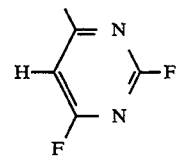

and Z is a heterocyclic reactive group and the remaining groups have the meaning given in the description, are highly suitable for the dyeing and printing of hydroxyl- or amido-containing materials.

9 Claims, No Drawings

REACTIVE DYESTUFFS FOR THE DYEING AND PRINTING OF HYDROXYL-OR AMINO-CONTAINING MATERIALS

The invention relates to reactive dyestuffs of the formula

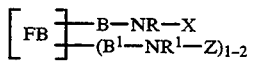   (1)

in particular dyestuffs of the formula

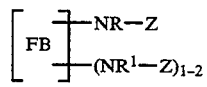   (1a)

where
FB is the radical of a dyestuff from the mono- or polyazo, metal complex azo, anthraquinone, phthalocyanine, formazan, azomethine, dioxazine, phenazine, stilbene, triphenylmethane, xanthene, thioxanthone, nitroaryl, naphthoquinone, pyrenequinone or perylenetetracarbimide series,
B and $B^1$, independently of one another, are a direct bond or a bridging member on a ring C atom of an aromatic-carbocyclic or on a ring C atom or ring N atom of an aromatic-heterocyclic ring in FB,
X is

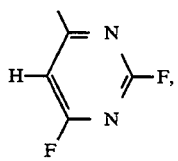

Z is a heterocyclic fibre-reactive radical and
R and $R^1$, independently of one another, are H, substituted or unsubstituted $C_1$–$C_6$-alkyl (preferred substituents: halogen, OH, COOH, $SO_3H$, $OSO_3H$).

Examples of suitable bridging members B and $B^1$, which may be identical or different, are

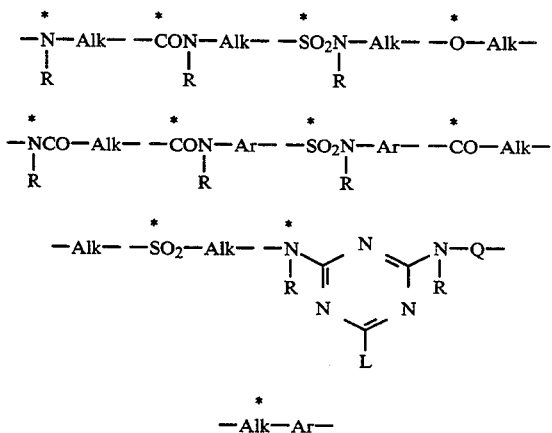

in which the asterisk marks the point of linkage with FB,
R has the abovementioned meaning, Alk denotes straight-chain or branched $C_1$–$C_6$-alkylene, which, if desired, is interrupted by hetero atoms or groupings containing hereto atoms such as N, O or S,
Ar denotes substituted or unsubstituted phenylene or naphthylene or the radical of a diphenyl or stilbene,
Q denotes Alk or Ar or —Alk—Ar— in which Alk or Ar can contain further substituents, for example F, Cl, Br, $C_1$–$C_4$-alkyl, $C_1$–$C_4$-alkoxy, carboxyl or sulpho, and
L denotes F, Cl, Br, substituted or unsubstituted amino, OH, $C_1$–$C_4$-alkoxy, substituted or unsubstituted phenoxy, or $C_1$–$C_4$-alkylthio.

Suitable fibre-reactive radicals Z, i.e. those reacting with the OH or NH groups of the fibres under dyeing conditions with the formation of covalent bonds, are in particular those containing at least one reactive substituent bound to a 5- or 6-membered aromatic-heterocyclic ring, for example to a monoazine, diazine or triazine ring, in particular a pyridine, pyrimidine, pyridazine, pyrazine, thiazine, oxazine or unsymmetrical or symmetrical triazine ring, or to such a ring system having one or more fused-on aromatic-carbocyclic rings, for example a quinoline, phthalazine, cinnoline, quinazoline, quinoxaline, acridine, phenazine or phenanthradine ring system.

Of the reactive substituents on the heterocycle, examples which may be mentioned are halogen (Cl, Br or F), ammonium, including hydrazinium, pyridinium, picolinium, carboxypyridinium, sulphonium, sulphonyl, azido ($N_3$), thiocyanato, thioether, oxyether, sulphinic acid and sulphonic acid.

Examples of individual radicals are:
2,4-difluorotriazin-6-yl,2,4-dichlorotriazin-6-yl,monohalogeno-sym.-triazinyl radicals, in particular monochloro- and monofluorotriazinyl radicals substituted by alkyl, aryl, amino, monoalkylamino, dialkylamino, aralkylamino, arylamino, morpholino, piperidino, pyrrolidino, piperazino, alkoxy, aryloxy, alkylthio, arylthio, alkyl preferably denoting substituted or unsubstituted $C_1$–$C_4$-alkyl, aralkyl, preferably substituted or unsubstituted phenyl-$C_1$–$C_4$-alkyl and aryl, preferably substituted or unsubstituted phenyl or naphthyl, and preferred substituents for alkyl being halogen, hydroxyl, cyano, vinylsulphonyl, substituted alkylsulphonyl, dialkylamino, morpholino, $C_1$–$C_4$-alkoxy, vinylsulphonyl-$C_2$–$C_4$-alkoxy, substituted alkylsulphonyl-$C_2$–$C_4$-alkoxy, carboxyl, sulpho or sulphato, and preferred substituents for phenyl and naphthyl being sulpho, $C_1$–$C_4$-alkyl, $C_1$–$C_4$-alkoxy, carboxyl, halogen, acylamino, vinylsulphonyl, substituted alkylsulphonyl, hydroxyl and amino.

The following individual radicals may be mentioned: 2-amino-4-fluoro-triazin-6-yl, 2-methylamino-4-fluoro-triazin-6-yl, 2-ethylamino-4-fluorotriazin-6-yl, 2-isopropylamino-4-fluoro-triazin-6-yl, 2-dimethylamino-4-fluoro-triazin-6-yl, 2-diethylamino-4-fluoro-triazin-6-yl, 2-β-methoxy-ethylamino-4-fluoro-triazin-6-yl, 2-β-hydroxyethylamino-4-fluoro-triazin-6-yl, 2-di-(β-hydroxyethylamino)-4-fluoro-triazin-6-yl, 2-β-sulphoethylamino-4-fluoro-triazin-6-yl, 2-β-sulphoethyl-methylamino-4-fluoro-triazin-6-yl, 2-carboxymethylamino-4-fluoro-triazin-6-yl, 2-di-(carboxymethylamino)-4-fluoro-triazin-6-yl, 2-sulphomethylmethylamino-4-fluoro-triazin-6-yl, 2-β-cyanoethylamino-4-fluoro-triazin-6-yl, 2-benzylamino-4-fluoro-triazin-6-yl, 2-β-phenylethylamino-4-fluoro-triazin-6-yl, 2-benzylmethylamino-4-fluoro-triazin-6-yl, 2-

(4'-sulphobenzyl)-amino-4-fluoro-triazin-6-yl, 2-cyclohexylamino-4-fluoro-triazin-6-yl, 2-(o-, m-, p-methylphenyl)-amino-4-fluoro-triazin-6-yl, 2-(o-, m-, p-sulphophenyl)-amino-4-fluoro-triazin-6-yl, 2-(2',5'-disulphophenyl)-amino-4-fluoro-triazin-6-yl, 2-(o-, m-, p-chlorophenyl)-amino-4-fluoro-triazin-6-yl, 2-(o-, m-, p-methoxyphenyl)-amino-4-fluoro-triazin-6-yl, 2-(2'-methyl-4'-sulphophenyl)-amino-4-fluoro-triazin-6-yl, 2-(2'-methyl-5'-sulphophenyl)-amino-4-fluoro-triazin-6-yl, 2-(2'-chloro-4'-sulphophenyl)-amino- 4-fluoro-triazin-6-yl, 2-(2'-chloro-5'-sulphophenyl)-amino-4-fluoro-triazin-6-yl, 2-(2'-methoxy-4'-sulphophenyl)-amino-4-fluoro-triazin-6-yl, 2-(o-, m-, p-carboxyphenyl)-amino-4-fluoro-triazin-6-yl, 2-(2',4'-disulphophenyl)-amino-4-fluoro-triazin-6-yl, 2-(3',5'-disulphophenyl)-amino-4-fluoro-triazin-6-yl, 2-(2'-carboxy-4'-sulphophenyl)-amino-4-fluoro-triazin-6-yl, 2-(2'-carboxy-5'-sulphophenyl)-amino-4-fluoro-triazin-6-yl, 2-(6'-sulphonaphthyl-(2'))-amino-4-fluoro-triazin-6-yl, 2-(4',8'-disulphonaphth-2'-yl)-amino-4-fluoro-triazin-6-yl, 2-(6',8'-disulphonaphth-2'-yl)-amino-4-fluoro-triazin-6-yl, 2-(N-methyl-N-phenyl)-amino-4-fluoro-triazin-6-yl, 2-(N-ethyl-N-phenyl)-amino-4-fluoro-triazin-6-yl, 2-(N-β-hydroxyethyl-N-phenyl)-amino-4-fluoro-triazin-6-yl, 2-(N-isopropyl-N-phenyl)-amino-4-fluoro-triazin-6-yl, 2-morpholino-4-fluoro-triazin-6-yl, 2-piperidino-4-fluoro-triazin-6-yl, 2-(4',6',8'-trisulphonaphth-2'-yl)-amino-4-fluoro-triazin-6-yl, 2-(3',6',8'-trisulphonaphth-2'-yl)-amino-4-fluoro-triazin-6-yl, 2-(3',6'-disulphonaphth-1'-yl)-amino-4-fluoro-triazin-6-yl, N-methyl-N-(2,4-dichlorotriazin-6-yl)-carbamyl, N-methyl-N-(2-methylamino-4-chlorotriazin-6-yl)-carbamyl, N-methyl-N-(2-dimethylamino-4-chlorotriazin-6-yl)-carbamyl, N-methyl- or N-ethyl-N-(2,4-dichlorotriazin-6-yl)-aminoacetyl-, 2-methoxy-4-fluoro-triazin-6-yl, 2-ethoxy-4-fluoro-triazin-6-yl, 2-phenoxy-4-fluoro-triazin-6-yl, 2-(o-, m- or p-sulphophenoxy)-4-fluoro-triazin-6-yl, 2-(o-, m- or p-methyl- or -methoxyphenoxy)-4-fluoro-triazin-6-yl, 2-β-hydroxyethylmercapto-4-fluoro-triazin- 6-yl, 2-phenylmercapto-4-fluoro-triazin-6-yl, 2-(4'-methylphenyl)-mercapto-4-fluoro-triazinyl, 2-(2',4'-dinitrophenyl)-mercapto-4-fluoro-triazin-6-yl, 2-methyl-4-fluoro-triazin-6-yl, 2-phenyl-4-fluoro-triazin-6-yl and the corresponding 4-chloro- and 4-bromo-triazinyl radicals and the corresponding radicals obtainable by halogen exchange with tertiary bases, such as trimethylamine, triethylamine, dimethyl-β-hydroxyethylamine, triethanolamine, N,N-dimethylhydrazine, pyridine, α- or β- or γ-picoline, nicotinic acid or isonicotinic acid, sulphinates, in particular benzenesulphinic acid or bisulphite.

The halogenotriazinyl radicals can also be linked to a second halogenotriazinyl radical or a halogenodiazinyl radical or to one or more vinylsulphonyl or sulphatoethylsulphonyl radicals or via a bridging member

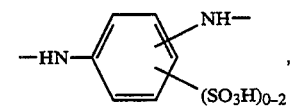

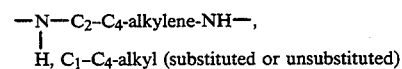

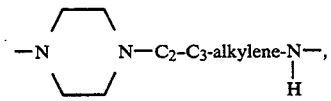

or in the case of the sulphatoethylsulphonyl or vinylsulphonyl group via a bridging member

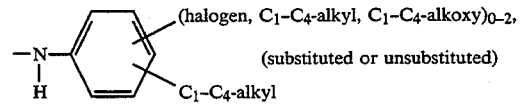

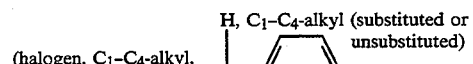

Preferred substituents for $C_1$–$C_4$-alkyl are: COOH, Cl, OH, $SO_3H$ and $OSO_3H$.

Examples of radicals linked in this manner are:

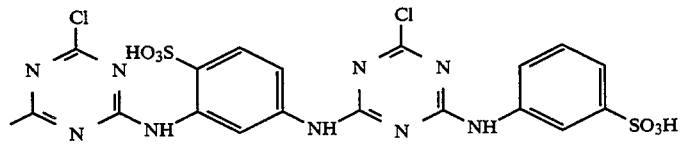

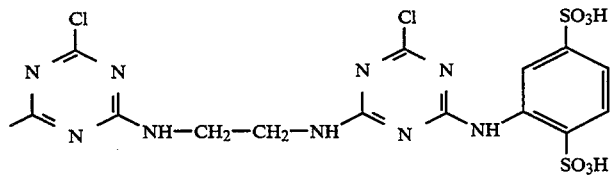

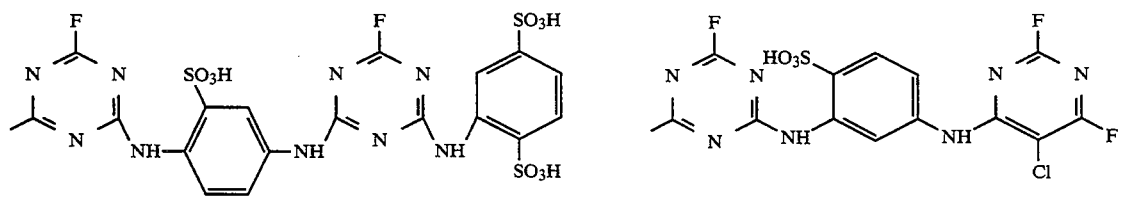
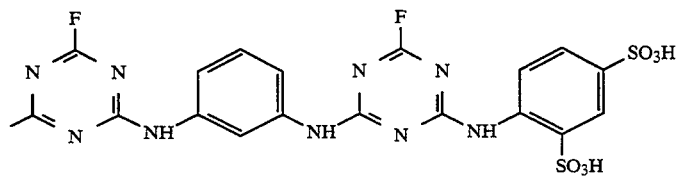
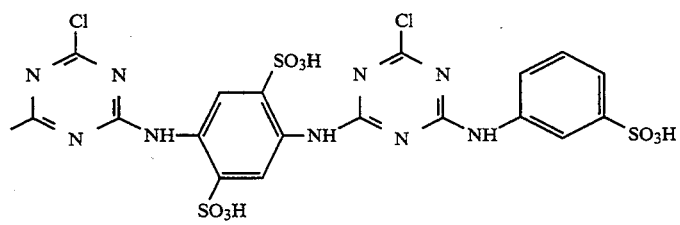
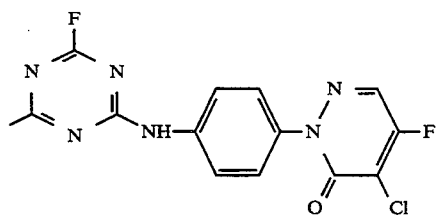
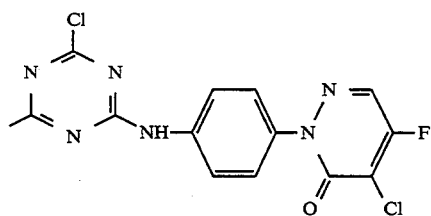
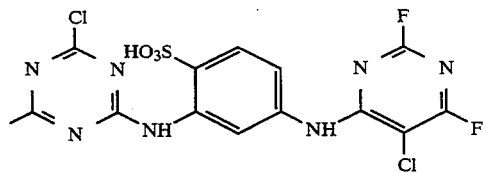
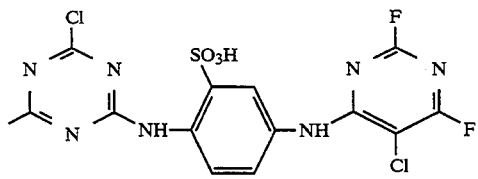
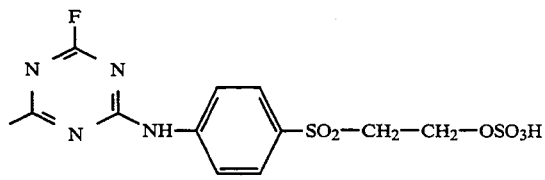
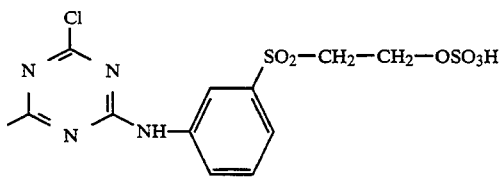
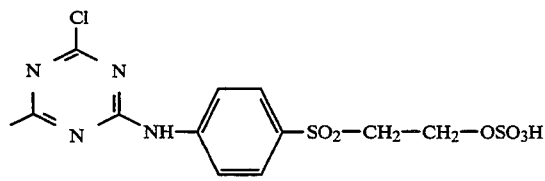
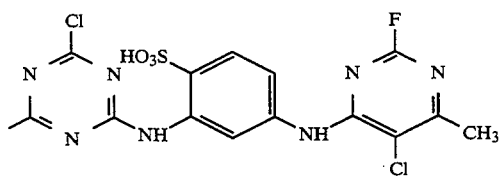
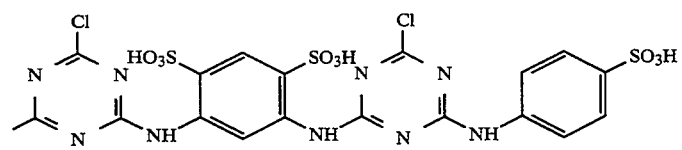

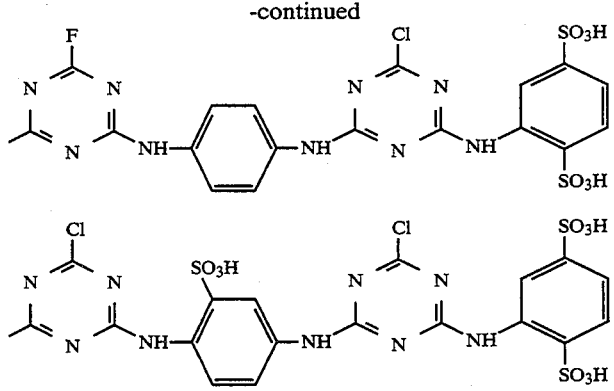

Further fibre-reactive radicals are:

Mono-, di- or trihalogenopyrimidinyl radicals, such as 2,4-dichloropyrimidin-6-yl, 2,4,5-trichloropyrimidin-6-yl, 2,4-dichloro-5-nitro- or -5-methyl- or -5-carboxymethyl- or -5-carboxy- or -5-cyano- or -5-vinyl- or -5-sulpho- or -5-mono-, -di-, or -trichloromethyl- or -5-carbalkoxy-pyrimidin-6-yl, 2,6-dichloropyrimidine-4-carbonyl-, 2,4-dichloropyrimidine-5-carbonyl, 2-chloro-4-methyl-pyrimidine-5-carbonyl-, 2-methyl-4-chloropyrimidine-5-carbonyl-, 2-methylthio-4-fluoropyrimidine-5-carbonyl-, 6-methyl-2,4-dichloropyrimidine-5-carbonyl-, 2,4,6-trichloropyrimidine-5-carbonyl-, 2,4-dichloropyrimidine-5-sulphonyl-, 2-chloro-quinoxaline-3-carbonyl-, 2- or 3- monochloroquinoxaline-6-carbonyl-, 2- or 3-monochloroquinoxaline-6-sulphonyl-, 2,3-dichloroquinoxaline-5- or -6-carbonyl-, 2,3-dichloroquinoxaline- 5- or -6-sulphonyl-, 1,4-dichlorophthalazine-6-sulphonyl- or -6-carbonyl-, 2,4-dichloroquinazoline-7- or -6-sulphonyl- or -carbonyl-, 2- or 3- or 4-(4',5'-dichloropyridazon-6'-yl-1')-phenylsulphonyl-or-carbonyl-, β-(4',5'-dichloropyridazon-6'-yl-1')-ethylcarbonyl-, N-methyl-N-(2,3-dichloroquinoxaline-6-sulphonyl)-aminoacetyl-, N-methyl-N-(2,3-dichloroquinoxaline-6-carbonyl)-aminoacetyl-, and the corresponding bromine and fluorine derivatives of the abovementioned chlorine-substituted heterocyclic radicals, of these, for example, 2-fluoro-4-pyrimidinyl, 2,6-difluoro-4-pyrimidinyl, 2,6-difluoro-5-chloro-4-pyrimidinyl, 2-fluoro-5,6-dichloro-4-pyrimidinyl, 2,6-difluoro-5-methyl-4-pyrimidinyl, 2-fluoro-5-methyl-6-chloro-4-pyrimidinyl, 2-fluoro-5-nitro-6-chloro-4-pyrimidinyl, 5-bromo-2-fluoro-4-pyrimidinyl, 2-fluoro-5-cyano-4-pyrimidinyl, 2-fluoro-5-methyl-4pyrimidinyl, 2,5,6-trifluoro-4-pyrimidinyl, 5-chloro-6-chloromethyl-2-fluoro-4-pyrimidinyl, 5-chloro-6-dichloromethyl-2-fluoro-4-pyrimidinyl, 5-chloro-6-trichloromethyl-2-fluoro-4-pyrimidinyl, 5-chloro-2-chloromethyl-6-fluoro-4-pyrimidinyl, 5-chloro-2-dichloromethyl-6-fluoro-4-pyrimidinyl, 5-chloro-2-trichloromethyl-6-fluoro-4-pyrimidinyl, 5-chloro-2-fluoro-dichloromethyl-6-fluoro-4-pyrimidinyl, 2,6-difluoro-5-bromo-4-pyrimidinyl, 2-fluoro-5-bromo-6-methyl-4-pyrimidinyl, 2-fluoro-5-bromo-6-chloromethyl-4-pyrimidinyl, 2,6-difluoro-5-chloromethyl-4-pyrimidinyl, 2,6-difluoro-5-nitro-4-pyrimidinyl, 2-fluoro-6-methyl-4-pryimidinyl, 2-fluoro-5-chloro-6-methyl-4-pyrimidinyl, 2-fluoro-5-chloro-4-pyrimidinyl, 2-fluoro-6-chloro-4-pyrimidinyl, 6-trifluoromethyl-5-chloro-2-fluoro-4-pyrimidinyl, 6-trifluoromethyl-2-fluoro-4-pyrimidinyl, 2-fluoro-5-nitro-4-pyrimidinyl, 2-fluoro-5-trifluoromethyl-4-pyrimidinyl, 2-fluoro-5-phenyl- or -5-methylsulphonyl-4-pyrimidinyl, 2-fluoro-5-carboxamido-4-pyrimidinyl, 2-fluoro-5-carbomethoxy-4-pyrimidinyl, 2-fluoro-5-bromo-6-trifluoromethyl-4-pyrimidinyl, 2-fluoro-6-carboxamido-4-pyrimidinyl, 2-fluoro-6-carbomethoxy-4-pyrimidinyl, 2-fluoro-6-phenyl-4-pyrimidinyl, 2-fluoro-6-cyano-4-pyrimidinyl, 5-chloro-6-fluoro-2-methyl-4-pyrimidinyl, 5,6-difluoro-2-trifluoromethyl-4-pyrimidinyl, 5-chloro-6-fluoro-2-dichlorofluoromethyl-4-pyrimidinyl, 2-fluoro-5-chloropyrimidin-4-yl, 2-methyl-4-fluoro-5-methylsulphonylpyrimidin-6-yl, 2,6-difluoro-5-methyl-sulphonyl-4-pyrimidinyl, 2,6-dichloro-5-methylsulphonyl-4-pyrimidinyl, 2- fluoro-5-sulphonamido-4-pyrimidinyl, 2-fluoro-5-chloro-6-carbomethoxy-4-pyrimidinyl, 2,6-difluoro-5-trifluoromethyl-4-pyrimidinyl; triazine radicals containing sulphonyl groups, such as 2,4-bis(phenylsulphonyl)-triazin-6-yl, 2-(3'-carboxyphenyl)-sulphonyl-4-chlorotriazin-6-yl, 2-(3'-sulphophenyl)-sulphonyl-4-chlorotriazin-6-yl, 2,4-bis-(3'-carboxyphenylsulphonyl)-triazin-6-yl; pyrimidine rings containing sulphonyl groups, such as 2-carboxymethylsulphonyl-pyrimidin-4-yl, 2-methylsulphonyl-6-methyl-pyrimidin-4-yl, 2-methylsulphonyl-6-ethyl-pyrimidin-4-yl, 2-phenylsulphonyl-5-chloro-6-methyl-pyrimidin-4-yl, 2,4-bis-methylsulphonyl-pyrimidin-4-yl, 2,6-bis-methylsulphonyl-pyrimidin-4-yl, 2,4-bis-methylsulphonyl-pyrimidine-5-sulphonyl, 2-methylsulphonyl-pyrimidin-4-yl, 2-phenylsulphonyl-pyrimidin-4-yl, 2-trichloromethylsulphonyl-6-methyl-pyrimidin-4-yl 2-methylsulphonyl-5-chloro-6-methyl-pyrimidin-4-yl, 2-methylsulphonyl-5-bromo-6-methyl-pyrimidin-4-yl, 2-methylsulphonyl-5-chloro-6-ethyl-pyrimidin-4-yl, 2-methylsulphonyl-5-chloro-6-chloromethyl-pyrimidin-4-yl, 2-methylsulphonyl-4-chloro-6-methyl-pyrimidine-5-sulphonyl, 2-methylsulphonyl-5-nitro-6-methyl-pyrimidin-4-yl, 2,5,6-tris-methylsulphonyl-pyrimidin-4-yl, 2-methylsulphonyl-5,6-dimethyl-pyrimidin-4-yl, 2-ethylsulphonyl-5-chloro-6-methyl-pyrimidin-4-yl, 2-methylsulphonyl-6-chloro-pyrimidin-4-yl, 2,6-bis-methylsulphonyl-5-chloro-pyrimidin-4-yl, 2-methylsulphonyl-6-carboxy-pyrimidin-4-yl, 2-methylsulphonyl-5-sulpho-pyrimidin-4-yl, 2-methylsulphonyl-6-carbomethoxy-pyrimidin-4-yl, 2-methylsulphonyl-5-carboxy-pyrimidin-4-yl, 2-methylsulphonyl-5-cyano-6-methoxy-pyrimidin-4-yl, 2-methylsulphonyl-5-chloro-pyrimidin-4-yl, 2-β-sulphoethylsulphonyl-6-methyl-pyrimidin-4-yl, 2-methylsulphonyl-5-bromo-pyrimidin-4-yl, 2-phenylsulphonyl-5-chloro-pyrimidin-4-yl, 2-carboxymethylsulphonyl-5-chloro-6-methyl-pyrimidin-4-yl, 2-methylsulphonyl-6-chloro-pyrimidin-4-yl and -5-carbonyl, 2,6-bis-(methyl-sulphonyl)-pyrimidin-4-yl or -5-carbonyl, 2-ethylsulphonyl-6-chloropyrimidine-5- carbonyl, 2,4-bis-(methylsulphonyl)-pyrimidine-5-sulphonyl, 2-methylsulphonyl-4-chloro-6-methylpyrimidine-5-sulphonyl or -carbonyl; 2-chlorobenzothiazole-5- or -6-carbonyl or -5- or -6-sulphonyl, 2-arylsulphonyl- or alkylsulphonylbenzothiazole-5- or -6-carbonyl or -5- or -6-sulphonyl such as 2-methylsulphonyl or 2-ethylsulphonylbenzothiazole-5- or -6- sulphonyl or -carbonyl, 2-phenylsulphonylbenzothiazole-5- or -6-sulphonyl or -carbonyl and the corresponding derivatives, containing sulpho groups in the fused-on benzene ring, of 2-sulphonylbenzothiazole-5- or -6-carbonyl or -sulphonyl, 2-chlorobenzoxazole-5- or -6-carbonyl or -sulphonyl, 2-chlorobenzimidazole-5- or -6-carbonyl or -sulphonyl, 2-chloro-1-methylbenzimidazole-5- or -6-carbonyl or -sulphonyl, 2-chloro-4-methylthiazole-5-carbonyl or -4- or -5-sulphonyl, and the N-oxide of 4-chloro- or 4-nitroquinoline-5-carbonyl.

Preference is given to reactive dyestuffs of the formula (1) in which FB is the radical of a mono- or disazo dyestuff or of a metal complex azo dyestuff.

In this case, the radicals —B—N(R)—X and —B$^1$—N(R$^1$)—Z are bound to different or identical radicals of starting components, i.e. diazo and coupling components. Preferably, the radicals —B—N(R)—X and —B$^1$—N(R')—Z are bound to one component each, diazo component or coupling component. The reactive dyestuffs then have, for example, the formula

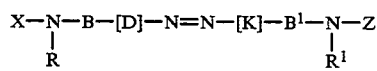 (1b)

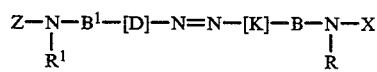 (1c)

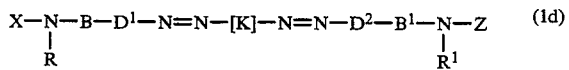 (1d)

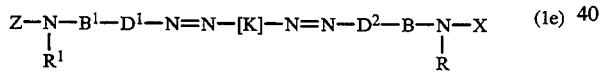 (1e)

in which —K— in formulae (1d) and (1e) represents the radical of a dicoupling component.

If both radicals —B—N(R)—X and —B$^1$—N(R$^1$)—Z are bound to the same radical of a starting component D or K, they are bound in particular to the radical of the coupling component K. The reactive dyestuffs then have the formula

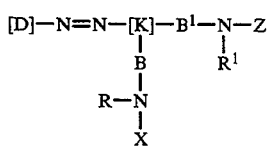 (1f)

in which
D, D$^1$, D$^2$ are the radical of a diazo component from the benzene or naphthalene series,
K is the radical of a coupling component from the benzene, naphthalene, acetoacetic arylide or heterocyclic series; in the heterocyclic series, it is preferably a pyrazolone or pyridone radical.

The radicals D, D$^1$, D$^2$ and K can be linked to further azo groups or radicals containing azo groups and also be substituted, as mentioned above for the radical FB of the formula (1), X, Z, B, B$^1$, R and R$^1$ having the above-mentioned meanings.

Examples of D, D$^1$ and D$^2$ are preferably phenyl or phenylene which is unsubstituted or substituted by SO$_3$H, chlorine, C$_1$–C$_4$-alkoxy, C$_1$–C$_4$-alkyl, carbalkoxy or sulphonamido, naphthyl or naphthylene which is unsubstituted or substituted by SO$_3$H, chlorine, C$_1$–C$_4$-alkoxy or C$_1$–C$_4$-alkyl, 4-(phenylazo)phenyl which is unsubstituted or substituted by SO$_3$H, and biphenylene which is unsubstituted or substituted by SO$_3$H.

K represents, for example, the radical of a coupling component from the hydroxybenzene, hydroxynaphthalene, aminobenzene, aminonaphthalene, aminohydroxynaphthalene series, a 5-hydroxy-3-methyl- (or carboxy)-pyrazolone or 6-hydroxy-2-pyridone radical or an acetoacetic arylide radical which is unsubstituted or ring-substituted by C$_1$–C$_4$-alkyl or C$_1$–C$_4$-alkoxy.

K can contain the customary substitutes, in particular sulpho groups.

Further suitable reactive dyestuffs of the formula (1b) to (1f) are those in which the radicals D, D$^1$, D$^2$ and K can contain a further reactive radical. Accordingly, tri- and tetra-reactive dyestuffs are also included, it being however necessary for at least one reactive radical to be a 2,6-difluoro-4-pyrimidinyl radical. The additional reactive radicals included in D or K can, like Z and X, be bound to D or K via amino groups or in a different manner, for example via a direct bond. The above explanations also apply analogously to the metal complexes of mono- and disazo dyestuffs (1b–1f).

Particular preference is given to reactive dyestuffs according to the invention of the formula (1) or (1a)–(1f) in which Z is a radical of the formula

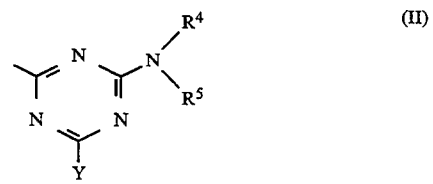 (II)

in which R$^4$ and R$^5$, independently of one another, are hydrogen, C$_{1-4}$-alkyl, which is unsubstituted or substituted by halogen, cyano, C$_{1-4}$-alkoxy, hydroxyl, carboxyl, sulpho or sulphato, or are benzyl, phenethyl, cyclohexyl, phenyl or —NHCH$_2$CH$_2$OCH$_2$CH$_2$—SO$_2$M (M is —CH=CH$_2$ or —CH$_2$CH$_2$—V where V is a radical which can be eliminated by alkali); phenyl, which is unsubstituted or substituted by halogen, nitro, cyano, trifluoromethyl, sulphamoyl, carbamoyl, C$_{1-4}$-alkyl, C$_{1-4}$-alkoxy, C$_{1-4}$-alkanoylamino, benzoylamino, ureido, hydroxyl, carboxyl, sulphomethyl or sulpho, or are naphthyl, which is unsubstituted or substituted by halogen, nitro, C$_{1-4}$-alkoxy, C$_{1-4}$-alkanoylamino, hydroxyl, carboxyl or sulpho, or in which R$^4$ and R$^5$ together with the amino nitrogen atom form a morpholino, piperidino or piperazino radical and in which Y is Cl, F or a substituted or unsubstituted pyridinium radical.

Of these, preference is given to dyestuffs where Y is F. Of the dyestuffs where Y is Cl, those are preferred in which —NR$^4$R$^5$ has the abovementioned meaning but is not

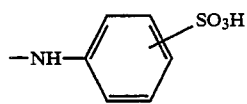

Furthermore, particular preference is given to dyestuffs according to the invention in which X and Z both represent a 2,6-difluoro-4-pyrimidinyl radical.

Furthermore, preference is given to dyestuffs of the formula (1) in which

Z represents

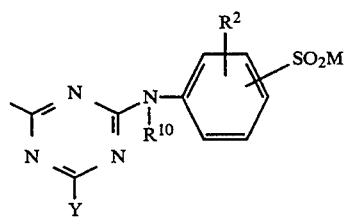

(III)

in which

Y is Cl, F or a substituted or unsubstituted pyridinium radical,

M is $CH=CH_2$ or $CH_2CH_2-V$, in which

V is a radical which can be eliminated by alkali, for example $OSO_3H$, $SSO_3H$, $OCOCH_3$, $OPO_3H_2$, $OSO_2CH_3$, SCN, $NHSO_2CH_3$, Cl, Br, F, $OCOC_6H_5$, $OSO_2-C_6H_4,[N(CH_3)_3]^+$anion$^-$ or a substituted or unsubstituted pyridinium radical (substituents are in particular substituted or unsubstituted $C_1-C_4$-alkyl, COOH, $SO_3H$, CN or carboxamide) and $R^2$ is H, Cl, Br, $C_1-C_4$-alkyl, $C_1-C_4$-alkoxy, $CO_2H$ or $SO_3H$ $R^{10}$ is H or substituted or unsubstituted $C_1-C_6$-alkyl.

Preferred substituents of $R^{10}$ are halogen, OH, $CO_2H$, $SO_3H$ and $OSO_3H$.

Preference is given to reactive dyestuffs of the formula

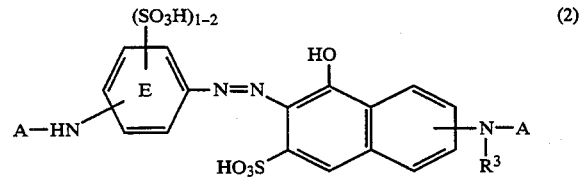

(2)

in which both radicals A are X or one A is X and the other A is Z, and X and Z have the meanings given in formula (1), $R^3$ is hydrogen, methyl or ethyl, and the benzene ring E is, if desired, further substituted.

Preference is also given to reactive dyestuffs of the formula

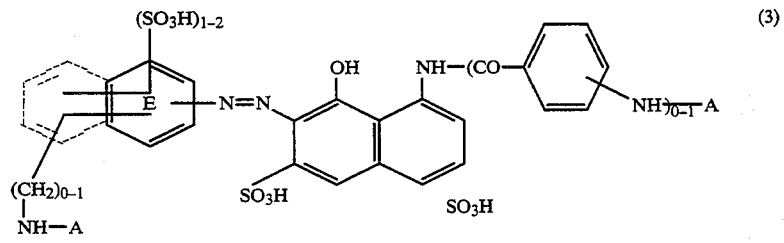

(3)

in which A and the benzene ring E have the abovementioned meaning.

Preference is given in particular to reactive dyestuffs of the formula (2) in which the benzene ring E is not further substituted, and to reactive dyestuffs of the formula (3) in which the benzene ring E is not further substituted.

Furthermore, preference is given to reactive dyestuffs of the formula

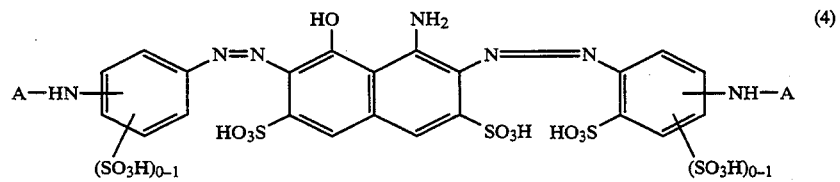

(4)

in which A has the abovementioned meaning.

Apart from the reactive dyestuffs described above of the formulae (2), (3) and (4), further valuable representatives are the reactive dyestuffs of the following formulae:

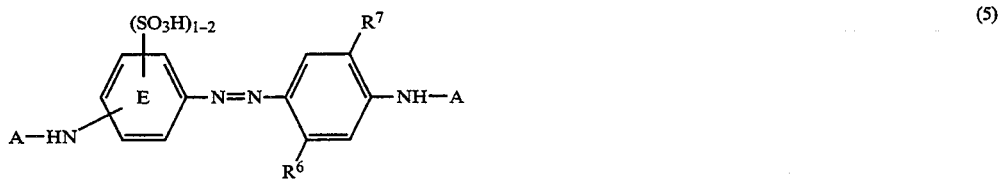

(5)

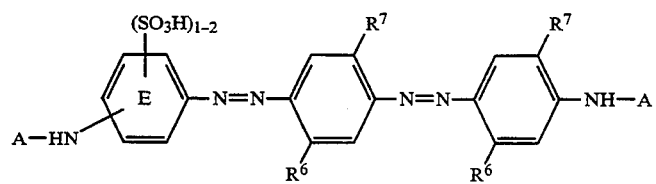
(6)
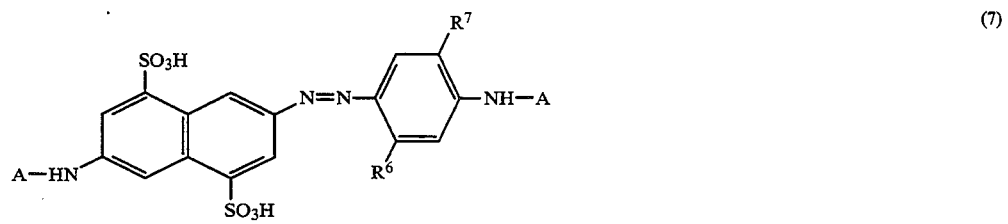
(7)
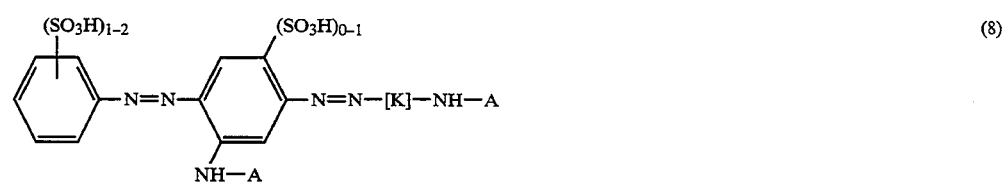
(8)
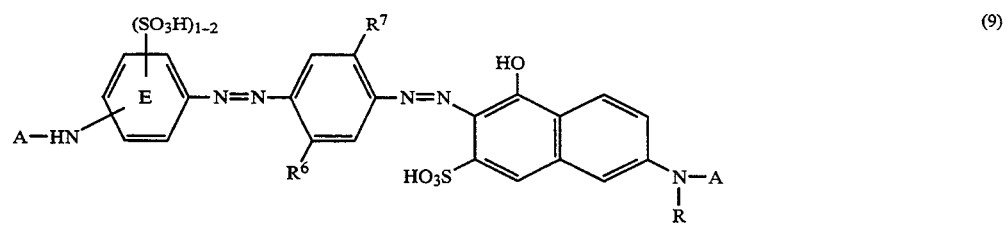
(9)
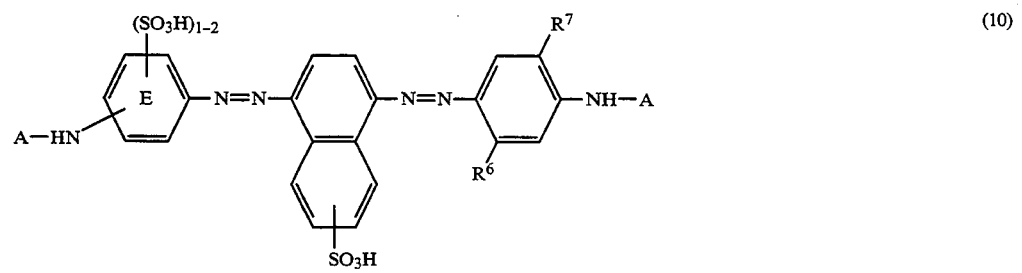
(10)
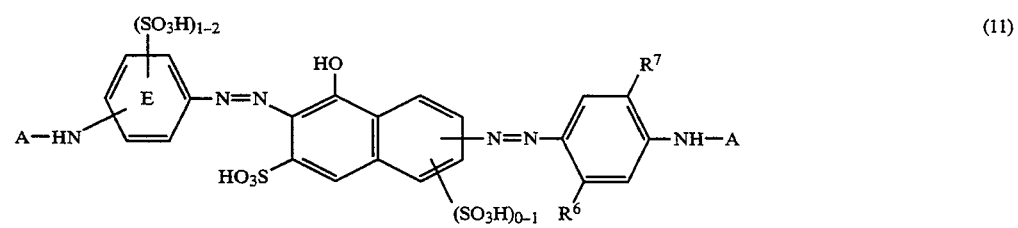
(11)
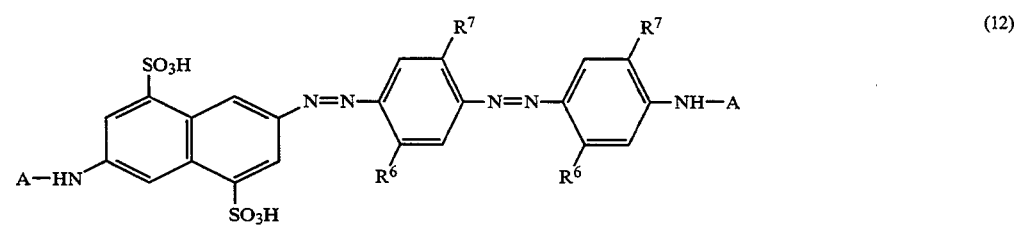
(12)

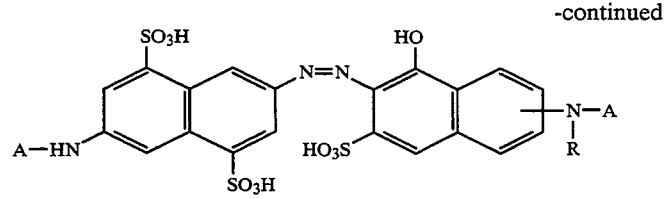
(13)
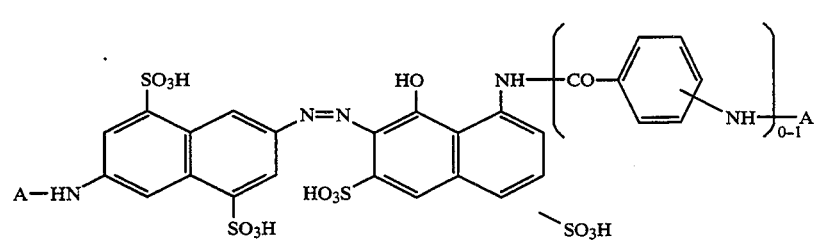
(14)
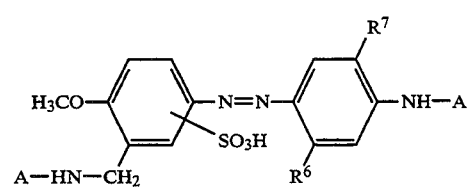
(15)
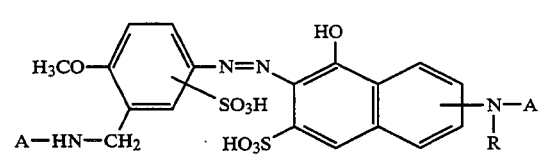
(16)
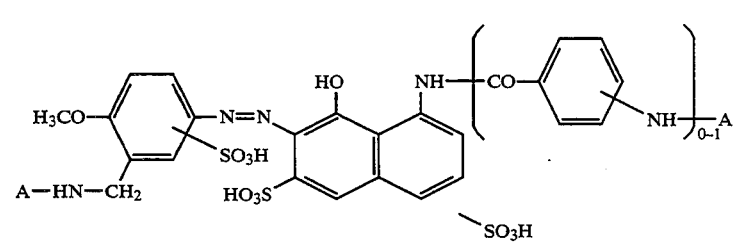
(17)
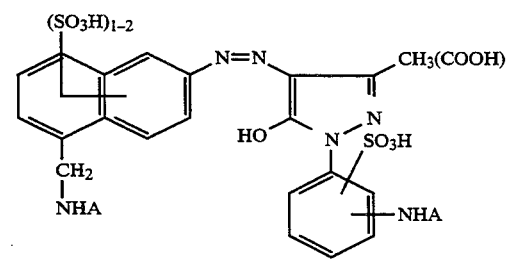
(18)
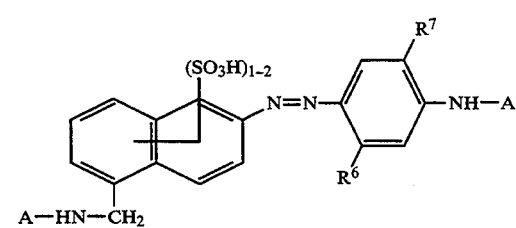
(19)
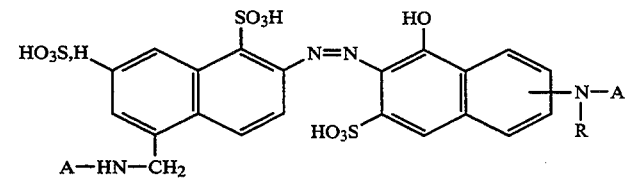
(20)

-continued
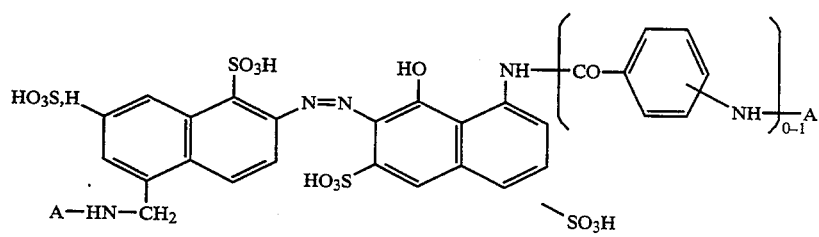 (21)
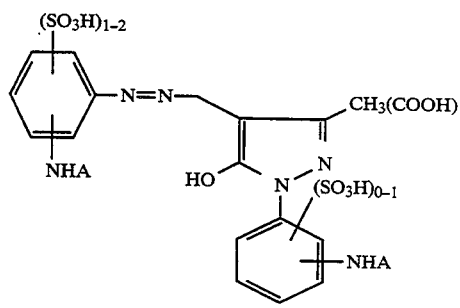 (22)
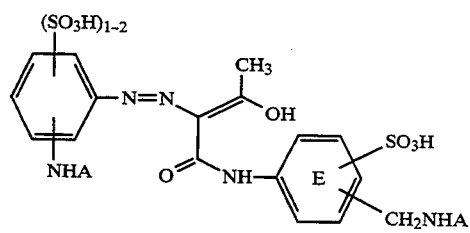 (23)
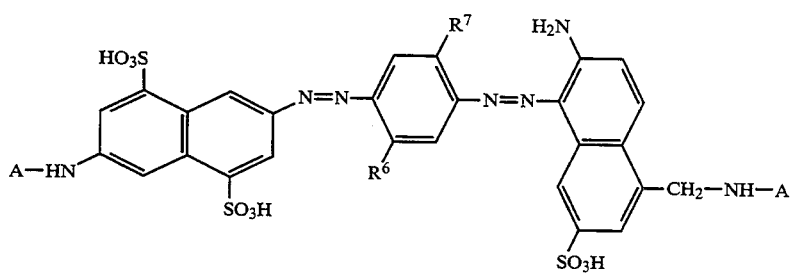 (24)
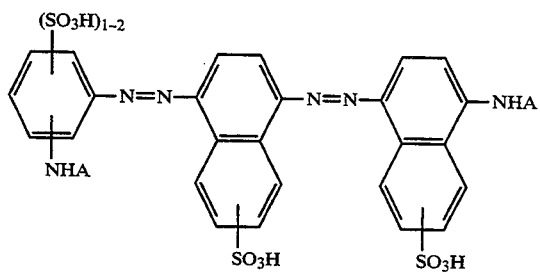 (25)
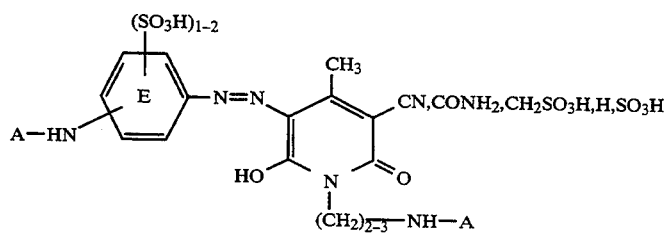 (26)

-continued
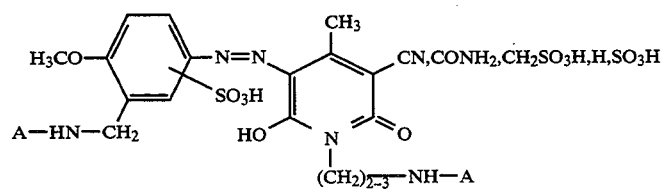
(27)
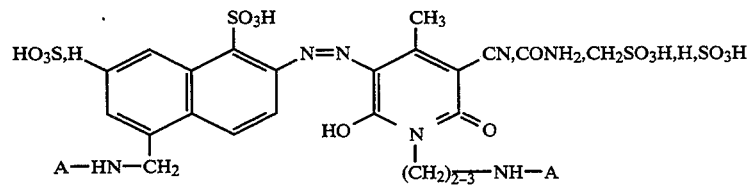
(28)
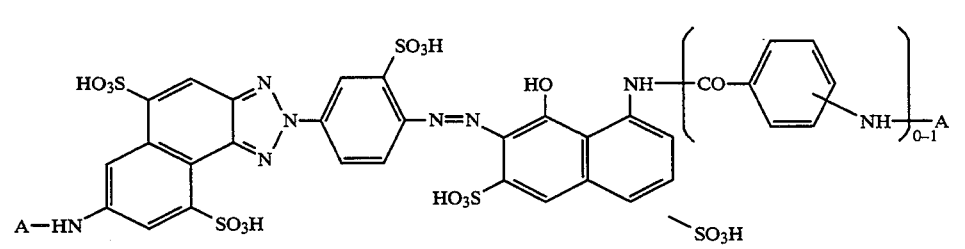
(29)
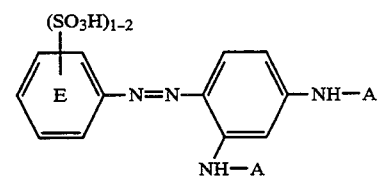
(30)
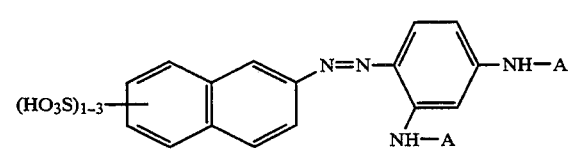
(31)
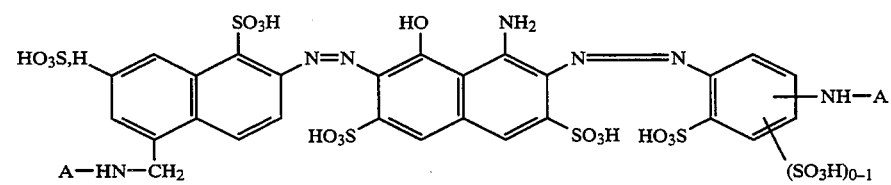
(32)
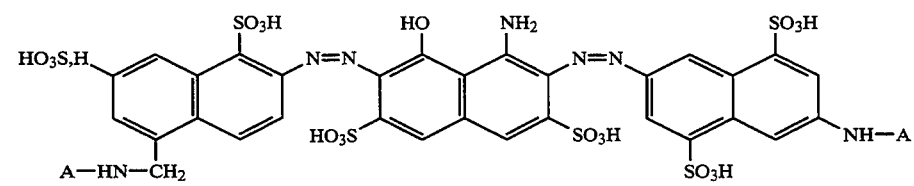
(33)
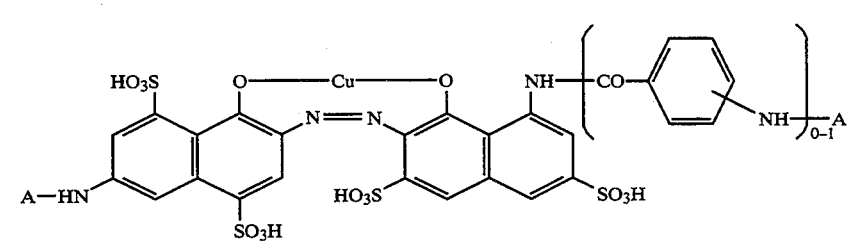
(34)

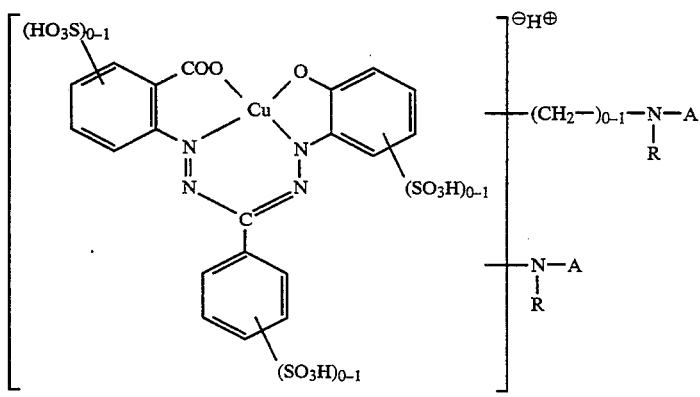
(35)

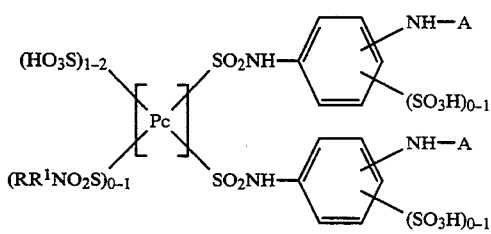
(36)

in which Pc represents a Cu phthalocyanine or an Ni phthalocyanine radical and the total number of substituents on the Pc skeleton is at most 4; R and R¹ have the abovementioned meaning,

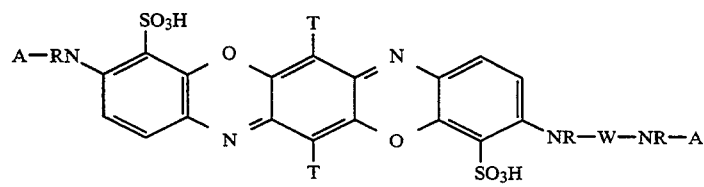
(37)

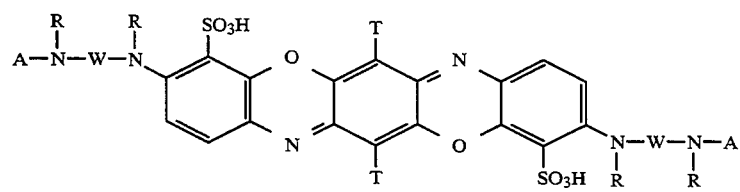
(38)

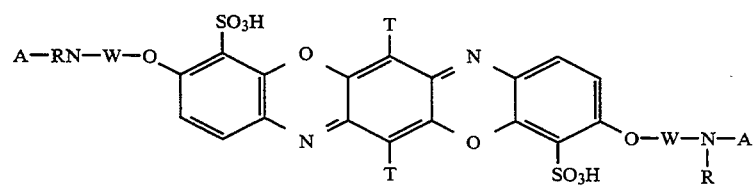
(39)

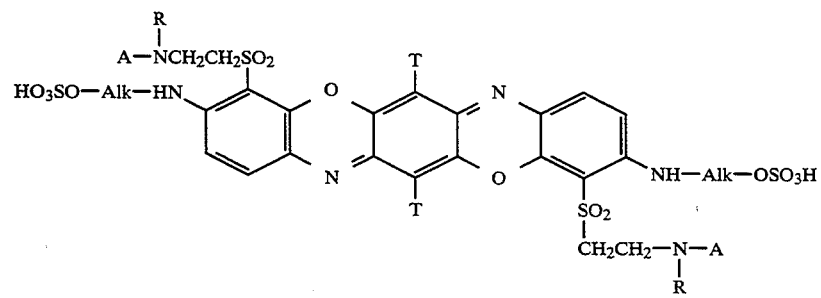
(40)

in which T is Cl, Br, OCH₃ and A, E, R and Alk have the abovementioned meanings, $R_6$ is H, $C_1$-$C_4$-alkyl, $C_1$-$C_4$-alkoxy, acylamino, in particular $C_1$-$C_4$-alkylcarbonylamino, $C_1$-$C_4$-alkylsulphonylamino, aminocarbonylamino, substituted or unsubstituted phenylcarbonylamino, Cl, Br R is H, $C_1$-$C_4$-alkyl, $C_1$-$C_4$-alkoxy, OH, SO₃H, W is an aliphatic bridging member, in particular $C_2$-$C_4$-alkylene.

In the preferred reactive dyestuffs of the formulae (2) and (3), the benzene rings E are preferably also not further substituted; the diazo components used in this case are in particular 1,3-phenylene-4-sulphonic acid, 1,4-phenylenediamine-2-sulphonic acid, 1,4-phenylenediamine-2,5-disulphonic acid or 1,3-phenylenediamine-4,6-disulphonic acid. The radical $R_3$ in formula (2) is in particular hydrogen, methyl or ethyl.

Preference is given in particular to reactive dyestuffs of the formulae (2) to (40) in which A is an unsubstituted or substituted aminofluoro-s-triazine radical, in which —$NR_4R_5$ preferably represents: —$NH_2$, morpholino, N-$\beta$-hydroxyethylamino, N,N-di-$\beta$-hydroxyethylamino, $\beta$-sulphoethylamino, phenylamino, which is unsubstituted or substituted in the phenyl ring by chlorine, methyl, ethyl, methoxy, ethoxy, acetylamino, hydroxyl, carboxyl, sulphomethyl or sulpho, N—$C_{1-4}$-alkyl-N-phenylamino, which is unsubstituted or substituted in the phenyl ring by chlorine, methyl or ethyl, N-sulpho-$C_{1-4}$-alkyl-N-phenylamino, which is unsubstituted or substituted in the phenyl ring by chlorine, methyl or ethyl, N-hydroxy-$C_{1-4}$-alkyl-N-phenylamino or sulphonaphthylamino, and the second reactive radical A represents a 6-fluoro-5-chloro-4-pyrimidinyl radical, such as, for example, dyestuffs of the formula (41)

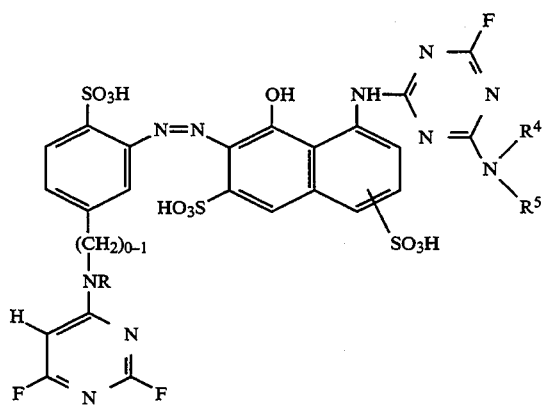
(41)

Preference is given to dyestuffs (2) to (40) in which both radicals A represent X and those in which one radical A represents X and the other represents

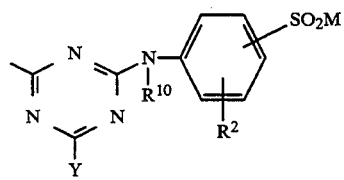
(III)

A process for the preparation of the dyestuffs (1) consists in reacting dyestuffs

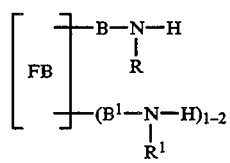
(IV)

or the corresponding dyestuff precursors with 1 to 2 mol of a reactive component

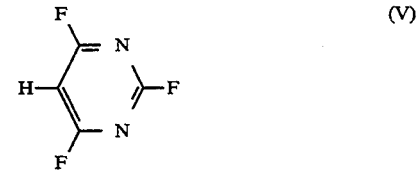
(V)

and, if desired, 1 to 2 mol of a reactive component

Z—Hal  (VI)

in which Hal is Cl, Br or F, and, in the case where precursors are used, then converting the product obtained into the desired final dyestuffs and, if desired, subsequently carrying out further conversion reactions.

When the preferred azo dyestuffs are prepared, the diazo components and the coupling components together must contain two amino groups —N(R)H and —N($R^1$)H and, if necessary, further acylatable amino groups. If desired, suitable acetylamino or nitro compounds are used, in which the acetylamino or nitro group is converted to the $NH_2$ group by hydrolysis or reduction before condensation with a halogenotriazine, halogenopyrimidine or the like is carried out. Introduction of the reactive radicals X and Z takes place by condensation of dyestuffs or dyestuff precursors containing acylatable amino groups, using fibre-reactive halogenated acylating agents. The preparation of the final dyestuffs from precursors in most cases involves coupling reactions leading to azo dyestuffs.

Since the individual abovementioned process steps can be carried out in a different order, various process variants are possible. In general, the reaction is carried out stepwise in succession, the order of the simple reactions between the individual reaction components advantageously depending on the particular conditions. Since under certain conditions hydrolysis of a halogenotriazine or halogenopyrimidine radical or the like takes place, an intermediate containing acetylamino groups has to be hydrolysed in order to eliminate the acetyl groups before it is condensed with an aminodifluorotriazine or trifluorotriazine or the like. A further possible conversion reaction is, for example, the subsequent reaction of a dihalogenotriazinyl radical with an amine. Which reaction in the preparation of a secondary condensation product from amine $HNR^4R^5$, 2,4,6-trihalogeno-2-triazine and diaminobenzenesulphonic acid is advantageously carried out first, that of the trihalogenotriazine with the amine or with the diaminobenzenesulphonic acid, differs from case to case and depends in particular on the solubility of the amino compounds involved and the basicity of the amino groups to be acylated. The most important process variants are described in the exemplary embodiments.

Examples of suitable starting compounds for the preparation of mono- or polyazo dyestuffs (1) are:

Diazo Components (D, $D^1$ and $D^2$)

1,3-diaminobenzene, 1,4-diaminobenzene, 1,3-diamino-4-chlorobenzene, 1,3-diamino-4-methylbenzene, 1,3-diamino-4-ethylbenzene, 1,3-diamino-4-methoxybenzene, 1,3-diamino-4-ethoxybenzene, 1,4-diamino-2-methylbenzene, 1,4-diamino-2-methoxybenzene, 1,4-diamino-2-ethoxybenzene, 1,4-diamino-2- chlorobenzene, 1,4-diamino-2,5-dimethylbenzene, 1,4-diamino-2,5-diethylbenzene, 1,4-diamino-2-methyl-5-methoxybenzene, 1,4-diamino-2,5-dimethoxybenzene, 1,4-diamino-2,5-diethoxybenzene, 2,6-diamino-naphthalene, 1,3-diamino-2,4,6-trimethylbenzene, 1,4-diamino-2,3,5,6-tetramethylbenzene, 1,3-diamino-4-nitrobenzene, 4,4'-diaminostilbene, 4,4'-diaminodiphenylmethane, 4,4'-diaminobiphenyl (benzidine), 3,3'-dimethylbenzidine, 3,3'-dimethoxybenzidine, 3,3'-dichlorobenzidine, 3,3'-dicarboxybenzidine, 3,3'-dicarboxymethoxybenzidine, 2,2'-dimethylbenzidine, 4,2'-diaminodiphenyl (diphenyline), 2,6-diaminonaphthalene-4,8-disulphonic acid, 1,4-diaminobenzene-2-sulphonic acid, 1,4-diaminobenzene-2,5-disulphonic acid, 1,4-diaminobenzene-2,6-disulphonic acid, 1,3-diaminobenzene- 4-sulphonic acid, 1,3-diaminobenzene-4,6-disulphonic acid, 1,4-diamino-2-chlorobenzene-5-sulphonic acid, 1,4-diamino-2-methylbenzene-5-sulphonic acid, 1,5-diamino-6-methylbenzene-3-sulphonic acid, 1,3-diamino-6-methylbenzene-4-sulphonic acid, 3-(3'- or 4'-aminobenzoylamino)-1-aminobenzene-6-sulphonic acid, 1-(4'-aminobenzoylamino)-4-aminobenzene-2,5-disulphonic acid, 1,4-diaminobenzene-2-carboxylic acid, 1,3-diaminobenzene-4-carboxylic acid, 1,2-diaminobenzene-4carboxylic acid, 1,3-diaminobenzene-5-carboxylic acid, 1,4-diaminobenzene-2-methylbenzene, 4,4'-diaminodiphenyl oxide, 4,4'-diaminodiphenylurea-2,2'-disulphonic acid, 4,4'-diaminodiphenyloxyethane-2,2'-disulphonic acid, 4,4'-diaminostilbene-2,2'-disulphonic acid, 4,4'-diaminodiphenylethane-2,2'-disulphonic acid, 2-amino-5-aminomethylnaphthalene-1-sulphonic acid, 2-amino-5-aminomethylnaphthalene-1-7-disulphonic acid, 1-amino-4-methoxy-5-aminomethylbenzene-6-sulphonic acid.

If it is desired to use an aminoacetyl amine or compound instead of diamine instead of a divine as the diazo component, from which afterwards the acetyl group is again eliminated by hydrolysis, as described above in the discussions of the process variants, monoacetyl compounds of the abovementioned diazo components are suitable, for example 1-acetylamino-3-aminobenzene-4-sulphonic acid or 1-acetylamino-4-aminobenzene-3-sulphonic acid.

If the two radicals —B—N(R)—X and B¹—N(R¹)—Z in formula (1) are bound with the same component, for example the coupling component, as described above, the diazo components used can also be those not containing any acylatable amino group, apart from the amino group to be diazotised, such as, for example, aminobenzene, 1-amino-2-, -3-, or -4-methylbenzene, 1-amino-2-, -3-, or -4-methoxybenzene, 1-amino-2-, -3-, or -4-chlorobenzene, 1-amino-2,5-dichlorobenzene, 1-amino-2,5-dimethylbenzene, 1-amino-3-methyl-6-methoxybenzene, 1-amino-2-methoxy-4-nitrobenzene, 1-aminobiphenyl, 1-aminobenzene-2-, -3-, or -4-carboxylic acid, 2-aminodiphenyl ether, 1-aminobenzene-2-, -3-, or -4-sulphonamide, 1-aminobenzene-2-, -3-, or -4-sulphonic acid, 1-aminobenzene-2,4- and -2,5-disulphonic acid, 1-amino-4-methylbenzene-2-sulphonic acid, 1-amino-3-methylbenzene-6-sulphonic acid, 1-amino-6-methylbenzene-3- or -4-sulphonic acid, 1-aminonaphthalene, 2-aminonaphthalene, 1-aminonaphthalene-2-, -4-, -5-, -6-, -7-, or -8-sulphonic acid, 2-aminonaphthalene-1-, -3-, -4-, -5-, -6-, -7-, or -8-sulphonic acid, 1-aminonaphthalene-3,6-, or -5-7-disulphonic acid, 2-aminonaphthalene-1,5-, -1,7-, -3,6-, -5,7-, -4,8- or -6,8-disulphonic acid, 1-aminonaphthalene-2,5,7-trisulphonic acid, 2-aminonaphthalene-1,5,7-, -3,6,8- or -4,6,8-trisulphonic acid, 4-aminobenzene-3,4'-disulphonic acid, 3-methoxy-4-amino-6-methylazobenzene-2',4'-disulphonic acid or 3-methoxy-4-amino-6-methylazobenzene-2',5'-disulphonic acid.

Coupling Components (K)

1-amino-3-methylbenzene, 1-amino-2-methoxy-5-methylbenzene, 1-amino-2,5-dimethylbenzene, 3-aminophenylurea, 1-amino-3-acetylaminobenzene, 1-amino-3-hydroxyacetylaminobenzene, 1,3-diaminobenzene-4-sulphonic acid, 1-aminonaphthalene-6- or -8-sulphonic acid, 1-amino-2-methoxynaphthalene-6-sulphonic acid, 2-aminonaphthalene-5,7-disulphonic acid, 1-amino-8-hydroxynaphthalene-6-sulphonic acid, 1-amino-8-hydroxynaphthalene-2,4-disulphonic acid, 2-hydroxy-3-aminonaphthalene-5,7-disulphonic acid, 1-amino-8-hydroxynaphthalene-2,4,6-trisulphonic acid, 1-hydroxy-8-acetylaminonaphthalene-3-sulphonic acid, 1-benzoylamino-8-hydroxynaphthalene-3,6- or -4,6-disulphonic acid, 2-benzoylamino-5-hydroxynaphthalene-7-sulphonic acid, 2-amino-5-hydroxynaphthalene-7-sulphonic acid, 2-methyl- or 2-ethylamino-5-hydroxynaphthalene-7-sulphonic acid, 2-(N-acetyl-N-methylamino)-5-hydroxynaphthalene-7-sulphonic acid, 2-acetylamino-5-hydroxynaphthalene-7-sulphonic acid, 2-amino-5-hydroxynaphthalene-1,7-disulphonic acid, 2-amino-8-hydroxynaphthalene-6-sulphonic acid, 2-methyl- or 2-ethyl-amino-8-hydroxynaphthalene-6-sulphonic acid, 2-(N-acetyl-N-methylamino-8-hydroxynaphthalene-6-sulphonic acid, 2-acetylamino-8-hydroxynaphthalene-6-sulphonic acid, 2-amino-8-hydroxynaphthalene-3,6-disulphonic acid, 2-acetylamino-8-hydroxynaphthalene-3,6-disulphonic acid, 1-amino-5-hydroxynaphthalene-7- sulphonic acid, 1-amino-5-hydroxynaphthalene-3,6- or -4,6-disulphonic acid, 1-acetylamino-8-hydroxynaphthalene-3,6-or-4,6-disulphonic acid, 1-(4'-aminobenzoylamino)-8-hydroxynaphthalene-3,6or -4,6-disulphonic acid, 1-(4'-nitrobenzoylamino)-8-hydroxynaphthalene-3,6- or -4,6-disulphonic acid, 1-(3'-aminobenzoylamino)-8-hydroxynaphthalene-3,6- or -4,6-disulphonic acid, 1-(3'-nitrobenzoylamino)-8-hydroxynaphthalene -3,6- or -4,6-disulphonic acid, 2-(4'-amino-3'-sulphophenylamino)-5-hydroxynaphthalene-7-sulphonic acid, 1-amino-8-hydroxynaphthalene-4-sulphonic acid, 2,4,6-triamino-3-cyanopyridine, 1-β-aminoethyl-3-cyano-4-methyl-6-hydroxy-2-pyridone, 1-γ-aminopropyl-3-sulphomethyl-4-methyl-6-hydroxy-2-pyridone, 1,3-diaminobenzene.

Diazotisation of the diazo components or the intermediates containing a diazotisable amino group is usually carried out by reaction with nitrous acid in aqueous mineral acid solution at low temperature. Coupling onto the coupling component is carried out at a strongly acid or neutral to weakly alkaline pH.

Condensation of the reactive components with the diazo components and the coupling components and with the amines or the acylatable monoazo or disazo intermediates or the dyestuffs containing amino groups are preferably carried out in aqueous solution or suspension, at low temperature and a weakly acidic, neutral to weakly alkaline pH. Advantageously, the hydrogen halide released during condensation is continuously neutralised by addition of aqueous alkali metal hydroxides, alkali metal carbonate or alkali metal bicarbonates.

The formulae given are those of the free acids. During preparation, the salts are in general obtained, in particular the alkali metal salts, such as sodium salts, potassium salts or lithium salts. The charge formed by quaternisation with pyridines is compensated as a function of the isolation conditions by a counterion, for example chloride, fluoride or sulphate; alternatively, the dyestuffs form inner salts with sulpho or carboxyl groups.

All dyestuffs, in particular those reacted in the last step with pyridines can be present, depending on the reaction conditions, as mixtures of β-sulphatoethylsulphonyl dyestuffs and the eliminated form thereof, i.e. the vinyl sulphone. The dyestuffs can also be used as concentrated solutions.

The dyestuffs according to the invention are highly suitable for the dyeing and printing of natural and synthetic OH— or amino-containing materials, in particular those made of celluloses and polyamides. They are particularly suitable for the dyeing of cellulose materials by the exhaust and cold pad-batch method, and for the printing of cotton and staple viscose.

Dyeings having good general fastness properties, in particular wet fastness properties, are obtained in combination with good build-up properties and high fixation yields.

DYEING PROCEDURES

The dyeings described in the examples below are carried out under the following conditions:

Dyeing Procedure 1

2 parts of the dyestuff are dissolved in 100 ml of water. The solution is added to 1900 parts of cold water, 60 parts of sodium chloride are added, and this dye bath is entered with 100 parts of a cotton fabric.

The temperature is increased to 60° C., 40 parts of calcined sodium carbonate and another 60 parts of sodium chloride being added after 30 minutes. The temperature is maintained at 60° C. for 30 minutes, the dyeing is then rinsed and soaped in a 0.3% strength boiling solution of an ion-free detergent for 15 minutes, rinsed and dried.

Dyeing Procedure 2

4 parts of the reactive dyestuff are dissolved in 50 parts of water. 50 parts of a solution containing 5 g of sodium hydroxide and 10 g of calcined sodium carbonate per litre are added. The solution obtained is used to pad a cotton fabric to a liquor pick-up of 70%, and the cotton fabric is then wound onto a batching roller. It is left in this manner at room temperature for 3 to 12 hours. The dyed material is then rinsed, soaped at the boil with a nonionic detergent for a quarter of an hour, rinsed again and dried.

EXAMPLE 1 a) 0.2 mol of 1-amino-8-hydroxynaphthalene-3,6-disulphonic acid is dissolved in 350 ml of water at a pH of 6.5, and the solution is cooled to 0° C. with 350 g of ice. 0.21 mol of 2,4,6-trifluoro-1,3,5-triazine (cyanuric fluoride) are added, and the pH is maintained between 3.5 and 4 with Na$_2$CO$_3$ solution. After 5 minutes, 0.2 mol of morpholine is added, and the pH is brought to 7 with sodium carbonate solution. During this procedure, the temperature rises to about 10° C.

b) 0.2 mol of 2,6-difluoro-4-(3'-amino-4'-sulphophenyl)pyrimidine (prepared from 2,4-diaminobenzenesulphonic acid and 2,4,6-trifluoropyrimidine) is suspended in water, and 65 ml of 30% strength hydrochloric acid and 300 g of ice are added. 46 ml of 30% strength sodium nitrite solution are then added, and the mixture is stirred at 0° C. for 1 hour. Excess sodium nitrite is destroyed using sulphamic acid, and the diazonium salt solution thus obtained is added to the solution of coupling component a).

The pH is brought to 6–7 with sodium carbonate solution.

After coupling is complete, the dyestuff is salted out, isolated, dried and ground. The dyestuff thus obtained of the formula

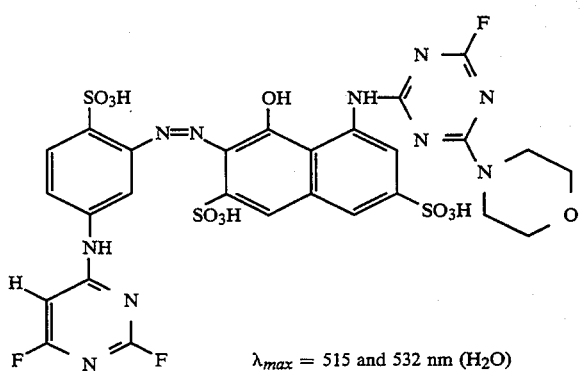

$\lambda_{max}$ = 515 and 532 nm (H$_2$O)

dyes cotton in clear red hues.

EXAMPLE 2 a) 0.2 mol of 1,4-diaminobenzene-2,5-disulphonic acid is dissolved in 500 ml of water under neutral conditions using conc. sodium hydroxide solution. The mixture is heated to 50° C., and 0.3 mol of 2,4,6-trifluoropyrimidine is added. The pH is maintained at 7 by the simultaneous addition of sodium carbonate solution (20 g/100 ml). The reaction is complete after 3 hours. The mixture is cooled to 0° C., and 55 ml of 30% strength HCl are added. 47 ml of sodium nitrite solution (30 g/100 ml) are added dropwise at 0° C.–5° C. over a period of 30 minutes. Stirring of the diazonium salt solution at 0°–5° C. is continued for 30 minutes. Excess nitrite is then destroyed using sulphamic acid.

b) 0.2 mol of 6-amino-1-naphthol-3-sulphonic acid is dissolved in 600 ml of water at a pH of 7–7.5 with the addition of 38 ml of 11% strength lithium hydroxide solution. 0.21 mol of cyanuric fluoride is added dropwise over a period of 30 minutes. During this addition, the pH is maintained at 3.7–4.1 by the simultaneous dropwise addition of 11% strength lithium hydroxide solution. Stirring is continued for 5 minutes, and 0.2 mol of morpholine is added. The pH is brought to 7 with sodium carbonate solution (20 g/100 ml). T=5°–8° C. Stirring is continued for 15 minutes, and the above diazonium salt solution a) is added dropwise over a period of 1 hour. The pH is maintained at 5.5–6.5 with 1-molar sodium bicarbonate solution. After coupling is complete, the product is salted out with NaCl, isolated and dried. The dyestuff of the formula

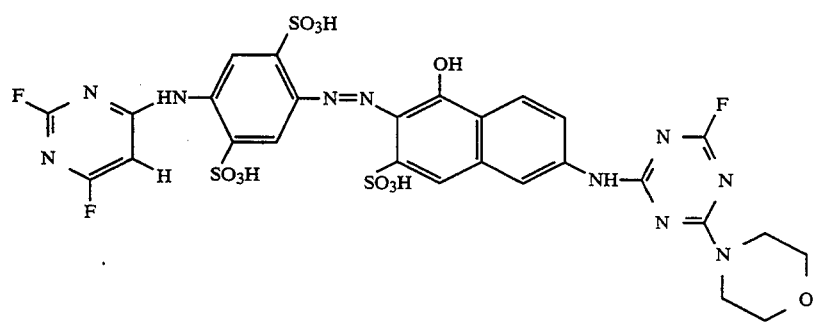
dyes cotton in red hues.
The dyestuffs of Examples 3-31 below of the general formula
X—D—N=N—K—Z
can be prepared analogously by using the diazo and coupling components and amines listed. They dye cotton in the hues listed.
X has the meaning given in formula (1).

| | Diazo component | Coupling component | Z | Hue |
|---|---|---|---|---|
| 4 | 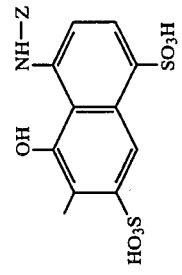 | 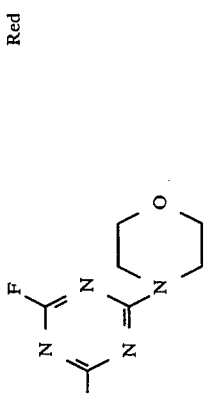 |  | Red |
| 5 |  | ″ | ″ | Red |
| 6 | 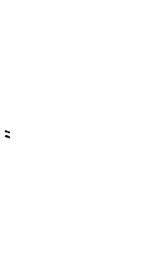 | ″ | 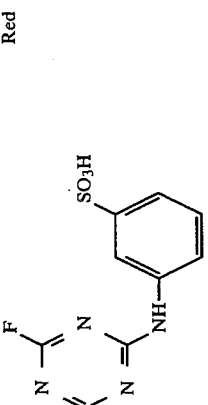 | Red |
| 7 | 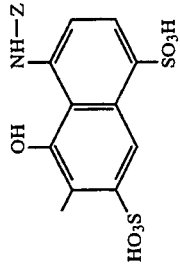 | 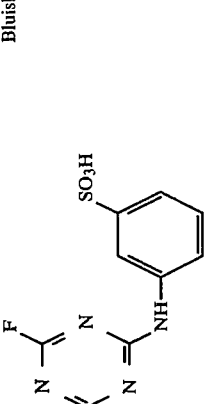 | 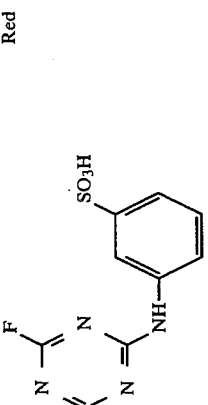 | Bluish red |

-continued

| | Diazo component | Coupling component | Z | Hue |
|---|---|---|---|---|
| 8 | 2-amino-4-(NH—X)-benzenesulfonic acid type structure (SO₃H, NH₂, NH—X) | naphthalene with OH, NH—CO—NH—C₆H₄—NH—Z, SO₃H, SO₃H, CH₃ | " | Red |
| 9 | benzene with SO₃H, NH₂, CH₂—N(CH₃)—X | " | " | Yellowish red |
| 10 | benzene with SO₃H, NH₂, X—HN | naphthalene with NH—Z, OH, SO₃H, HO₃S, CH₃ | (triazine with F, N, N, N-phenyl, N-C₂H₅, CH₃) | Bluish red |
| 11 | benzene with SO₃H, NH₂, OCH₃, X—NH—CH₂ | " | (triazine with F, N, N, N-morpholino, CH₃) | Red |

-continued

| | Diazo component | Coupling component | Z | Hue |
|---|---|---|---|---|
| 12 | ![structure: 2-amino-1-sulfo-5-(X-HN-CH2)-naphthalene] | " | ![structure: triazine with F, CH3, N(CH3)CH2CH2SO3H] | Red |
| 13 | ![structure: benzene with NH2, SO3H, X-HN] | ![structure: 4-amino-5-hydroxy-naphthalene-1,7-disulfonic acid with NH-Z] | ![structure: triazine with F, CH3, morpholino] | Red-violet |
| 14 | ![structure: benzene with NH2, SO3H, X-NH] | " | ![structure: triazine with F, CH3, N(CH3)CH2CH2CN] | Red |
| 15 | " | ![structure: 4-amino-5-hydroxy-naphthalene-2,7-disulfonic acid with NH-Z] | ![structure: triazine with F, CH3, N(phenyl)CH2CH2OH] | Red $\lambda_{max}$ = 515 nm, sh 532 nm |

-continued

| | Diazo component | Coupling component | Z | Hue |
|---|---|---|---|---|
| 16 | 3-amino-4-sulfo-aniline with NH-X | naphthalene with NH-Z, OH, SO₃H, HO₃S | triazine with F, N-Et, 4-chlorophenyl | Red $\lambda_{max}$ = 514 nm, sh 530 nm |
| 17 | 2-amino-4-sulfo with X-N(CH₃)-CH₂- | " | triazine with F, N-Et, phenyl | Red $\lambda_{max}$ = 512 nm, sh 535 nm |
| 18 | naphthalene with SO₃H, CH₃, X-HN-CH₂- | " | triazine with F, NH, 3-sulfophenyl | Bluish red |
| 19 | 3-amino-4-sulfo-aniline with X-HN | naphthalene with NH-Z, OH, SO₃H, HO₃S | triazine with F, NH, naphthyl-SO₃H | Red-violet |

-continued

| | Diazo component | Coupling component | Z | Hue |
|---|---|---|---|---|
| 20 | X—NHCH$_2$CH$_2$SO$_2$—C$_6$H$_4$—NH$_2$ | " | (triazine with F, CH$_3$, N(Et)Ph) | Red |
| 21 | 1,5-naphthalene: X—NHCH$_2$CH$_2$SO$_2$— with NH$_2$ and SO$_3$H | " | (triazine with F, CH$_3$, N(Et)Ph) | Red |
| 22 | benzene with SO$_3$H, NH$_2$, X—NH | (naphthalene with NH—Z, OH, SO$_3$H, HO$_3$S) NHCH$_2$CH$_2$OCH$_2$CH$_2$SO$_2$CH=CH$_2$ | (triazine with F, CH$_3$, NH—) | Red λ$_{max}$ = 514, 532 nm |
| 23 | benzene with SO$_3$H, NH$_2$, X—NH | " | (triazine with F, CH$_3$, morpholino) | Red-violet |
| 24 | benzene with SO$_3$H, NH$_2$, X—N(CH$_3$)CH$_2$— | " | " | Red λ$_{max}$ = 514, 533 nm |

-continued

| | Diazo component | Coupling component | Z | Hue |
|---|---|---|---|---|
| 25 | SO₃H, NH₂, X—NH (benzene) | Naphthalene with OH, NH-CO-NH-(phenyl)-NH-Z, SO₃H, CH₃, SO₃H | Triazine with F, N-morpholine, CH₃ | Red |
| 26 | SO₃H, NH₂, X—N(CH₃)—CH₂ (benzene) | " | Triazine with F, N(CH₃)(phenyl), CH₃ | Red λ$_{max}$ = 512 nm, 535 nm |
| 27 | SO₃H, NH₂, X—NH (benzene) | Naphthalene with OH, CH₃, SO₃H, NH-Z | Triazine with F, N-morpholine, CH₃ | Bright red |
| 28 | SO₃H, NH₂, X—N(CH₃)—CH₂ (benzene) | Naphthalene with OH, CH₃, SO₃H, NH-Z | Triazine with F, N-morpholine, CH₃ | Orange |

-continued

| | Diazo component | Coupling component | Z | Hue |
|---|---|---|---|---|
| 29 | 2-amino-4-(NH—X)-benzenesulfonic acid (SO₃H, NH₂, NH—X on benzene) | " | triazine with F, N, methyl, N(Et)(phenyl) substituents | Orange |
| 30 | 2-amino-4-(NH—X)-benzenesulfonic acid | 6-amino-1-hydroxy-2-methyl-naphthalene-3,7-disulfonic acid with NH—Z | " | Bright red $\lambda_{max}$ = 506 nm |
| 31 | 2-amino-4-(NH—X)-benzenesulfonic acid | 7-amino-1-hydroxy-2-methyl-naphthalene-3-sulfonic acid with NH—Z | triazine with F, N, methyl, NH-(3-sulfophenyl) | Orange |

EXAMPLE 32

0.2 mol of 1-amino-8-hydroxynaphthalene-3,6-disulphonic acid is dissolved in 450 ml of water at a pH of 8-9 using sodium hydroxide solution, and 0.22 mol of 2,4,6-trifluoropyrimidine is added. Condensation takes place at 35°-40° C., during which the pH is kept constant with sodium carbonate solution.

If the diazonium salt solution described in Example 1 is used for coupling under the same conditions, the dyestuff of the formula

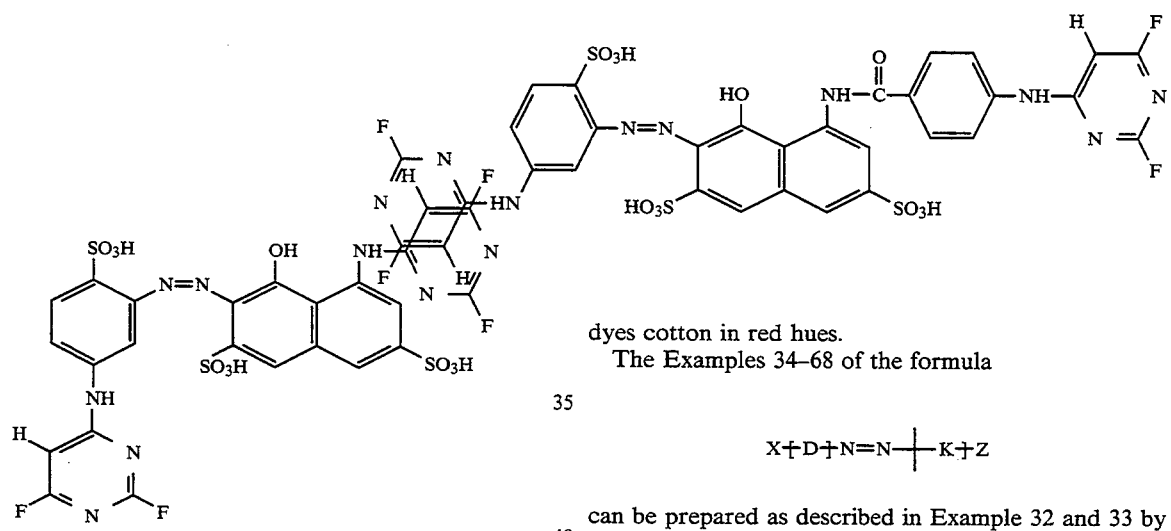

which dyes cotton in red hues, is obtained after salting out, isolation and drying.

EXAMPLE 33

0.2 mol of 8-(4'-amino-benzoylamino)-1-naphthol-3,6-disulphonic acid is dissolved in 800 ml of water at a pH of 7 using sodium carbonate solution (20 g/100 ml). The pH is brought to 4.5 with 10% strength HCl solution. 2.2 mol of 2,4,6-trifluoropyrimidine are added, and the mixture is heated to 30° C. The pH is maintained at 4.5-6 with sodium carbonate solution (20 g/100 ml). Reaction is complete after 4 hours.

0.2 mol of the diazonium salt from Example 1 is then added, and the pH is simultaneously maintained at 7.5-8 by dropwise addition of sodium carbonate solution (20 g/100 ml). After coupling is complete, the product is salted out with NaCl, isolated and dried. The dyestuff of the formula dyes cotton in red hues.

The Examples 34–68 of the formula

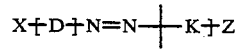

can be prepared as described in Example 32 and 33 by using the corresponding intermediates. They dye cotton in the hues given.

| | Diazo component | Coupling component | Z | Hue |
|---|---|---|---|---|
| 34 | ![structure: benzene with SO3H, H3C, NH2, X—NH] | ![naphthol with OH, NH—Z, HO3S, SO3H] | ![pyrimidine with N, N, Cl, F] | Red |
| 35 | ![benzene with SO3H, NH2, X—NH] | ![naphthol with OH, NH—Z, HO3S, SO3H] | ![pyrimidine with N, N, Cl, F] | Red-violet |
| 36 | ![benzene with SO3H, NH2, X—N(CH3)—CH2] | " | " | Red |

-continued

| | Diazo component | Coupling component | Z | Hue |
|---|---|---|---|---|
| 37 | (naphthalene with SO₃H, NH₂, and X—HN—CH₂ substituents) | " | " | Bluish red |
| 38 | (benzene with SO₃H, NH₂, and X—N(CH₃)—CH₂ substituents) | (naphthalene with OH, NH—Z, CH₃, SO₃H, SO₃H substituents) | (pyrimidine with Cl and F) | Red |
| 39 | (naphthalene with SO₃H, NH₂, and X—HN—CH₂ substituents) | " | " | Red |
| 40 | (benzene with two SO₃H, NH₂, and X—HN substituents) | " | " | Bluish red |
| 41 | (benzene with SO₃H, NH₂, and X—NH substituents) | (naphthalene with OH, NH—Z, CH₃, SO₃H, SO₃H substituents) | (pyrimidine with Cl and F) | Red |
| 42 | (benzene with SO₃H, NH₂, and X—NH substituents) | (naphthalene with OH, CH₃, SO₃H, NH—Z substituents) | " | Bright Red |
| 43 | (benzene with SO₃H, NH₂, and X—N(CH₃)—CH₂ substituents) | " | " | Orange |
| 44 | (benzene with two SO₃H, NH₂, and X—HN substituents) | (naphthalene with OH, CH₃, SO₃H, NH—Z substituents) | (pyrimidine with Cl and F) | Red |

-continued

| | Diazo component | Coupling component | Z | Hue |
|---|---|---|---|---|
| 45 | 2-amino-4-(X—NH)-benzenesulfonic acid | 4-hydroxy-3-methyl-6-(NH—Z)-naphthalene-2-sulfonic acid | " | Orange |
| 46 | 2-amino-4-(X—NH)-benzenesulfonic acid | 4-hydroxy-3-methyl-6-(N(CH₃)—Z)-naphthalene-2-sulfonic acid | 2-fluoro-5-chloro-6-fluoropyrimidinyl | Orange |
| 47 | 2-amino-5-(X—NH)-benzenesulfonic acid | 8-(NH—CO—C₆H₄—NH—Z)-1-hydroxy-7-methyl-naphthalene-3,5-disulfonic acid | 5-chloro-6-fluoropyrimidinyl | Bluish red |
| 48 | 2-amino-4-(X—N(CH₃)—CH₂)-benzenesulfonic acid | " | " | Red |
| 49 | 2-amino-5-(X—NH—CH₂)-naphthalene-1-sulfonic acid | " | 2-fluoro-5-chloro-6-fluoropyrimidinyl | Red |
| 50 | 2-amino-5-(X—NH)-benzene-1,4-disulfonic acid | 8-(NH—CO—C₆H₄—NH—Z)-1-hydroxy-7-methyl-naphthalene-3,5-disulfonic acid | 5-chloro-6-fluoropyrimidinyl | Bluish red |
| 51 | 2-amino-4-(X—NH)-benzenesulfonic acid | 8-(NH—CO—C₆H₄—NH—Z)-1-hydroxy-7-methyl-naphthalene-3,5-disulfonic acid | " | Red |
| 52 | 4-amino-(X—NH—CH₂CH₂SO₂)-benzene | 8-(NH—Z)-1-hydroxy-7-methyl-naphthalene-3,6-disulfonic acid | " | Red |

-continued

| | Diazo component | Coupling component | Z | Hue |
|---|---|---|---|---|
| 53 | 2-amino-4-(X-NH)-benzene with SO₃H ortho to NH₂ | 1-OH, 8-NH-Z, 2-methyl, 3,6-disulfo naphthalene (HO₃S at 3, SO₃H at 6) | 2,6-difluoro-4-methylpyrimidine | Red-violet |
| 54 | 2-amino-4-(X-NH-CH₂)-benzenesulfonic acid | " | " | Red |
| 55 | 2-amino-1-sulfo-5-(X-HN-CH₂)-naphthalene | " | " | Bluish red |
| 56 | 2-amino-4-[X-N(CH₃)-CH₂]-benzenesulfonic acid | 1-OH, 8-NH-Z, 2-methyl, 3,6-disulfo naphthalene | 2,6-difluoro-4-methylpyrimidine | Red |
| 57 | 2-amino-1-sulfo-5-(X-HN-CH₂)-naphthalene | " | " | Red |
| 58 | 2-amino-1,4-disulfo-5-(X-HN)-benzene | " | " | Bluish red |
| 59 | 2-amino-4-(X-NH)-benzenesulfonic acid | 1-OH, 8-NH-Z, 2-methyl, 3,6-disulfo naphthalene | 2,6-difluoro-4-methylpyrimidine | Red |
| 60 | 2-amino-5-(X-NH)-benzenesulfonic acid | 1-OH, 2-methyl, 3-sulfo, 6-(NH-Z) naphthalene | " | Bright red |

-continued
| | Diazo component | Coupling component | Z | Hue |
|---|---|---|---|---|
| 61 | 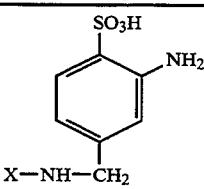 | " | " | Orange |
| 62 | 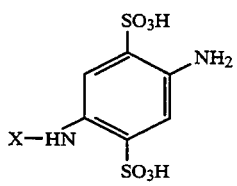 | 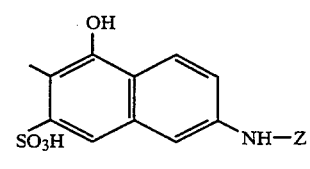 | 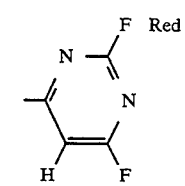 | Red |
| 63 | 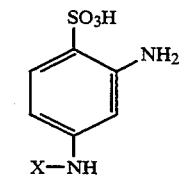 | 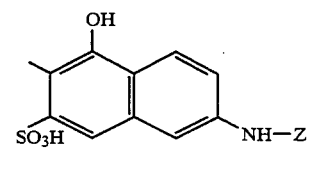 | " | Orange |
| 64 | 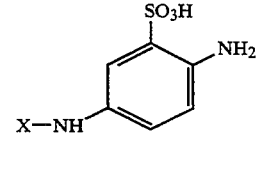 | 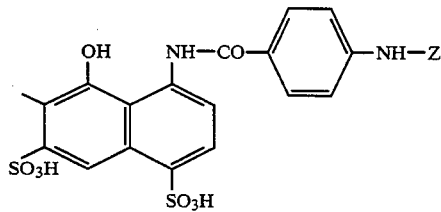 | 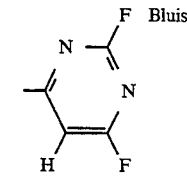 | Bluish red |
| 65 | 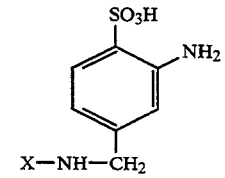 | " | " | Red |
| 66 | 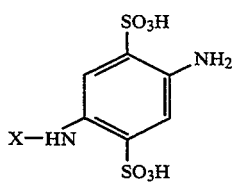 | 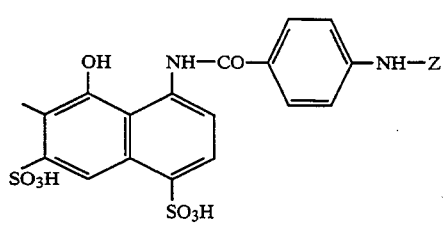 | 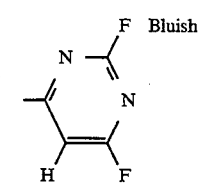 | Bluish red |
| 67 | 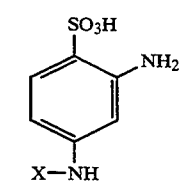 | 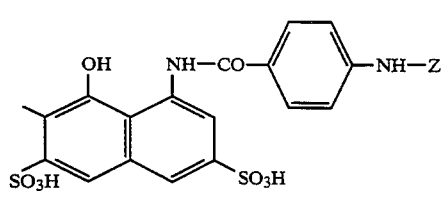 | " | Red |
| 68 | 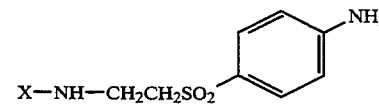 | 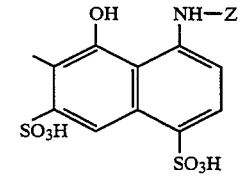 | " | Red |

EXAMPLE 69

0.2 mol of 1-amino-8-hydroxynaphthalene-3,6-disulphonic acid is dissolved in 650 ml of water at a pH of 6.5 using sodium hydroxide solution, and the mixture is heated to 35° C. 0.21 mol of 2,3-dichloroquinoxaline-6-carbonyl chloride is added to the solution and the pH is brought to 6–7 with sodium carbonate solution, and condensation is carried out at 35° C. for about 6 hours.

The condensation product is then coupled onto the 2,6-difluoro-4-(3'-amino-4'-sulphophenylamino)-pyrimidine diazonium salt solution analogously to Example 1.

The dyestuff is salted out, isolated, dried and ground. It has the following formula

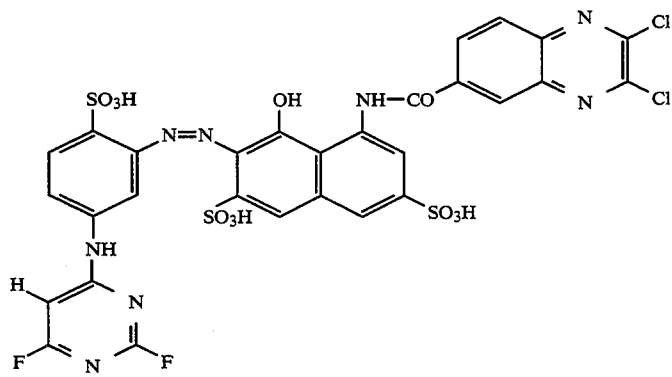

and dyes cotton in red hues.

The dyestuffs of Examples 70–80 of the formula

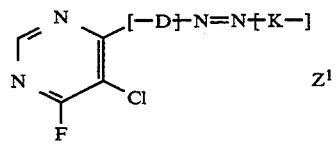

can be prepared as described above, using the diazo and coupling components (K) mentioned, in which X has the meaning given in formula (1) and $Z^1$ is

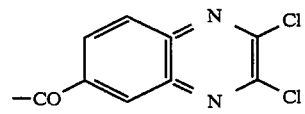

| Ex. | Diazo component | K | Hue |
|---|---|---|---|
| 70 | ![](SO3H, NH2, X—NH benzene) | ![](OH, NH—Z¹, HO3S, SO3H naphthalene) | Bluish red |
| 71 | ![](SO3H, NH2, X—N(CH3)—CH2 benzene) | " | Red |
| 72 | ![](SO3H, NH2, SO3H, X—HN benzene) | " | Bluish red |
| 73 | ![](SO3H, NH2, X—NH benzene) | " | Red |

-continued

| Ex. | Diazo component | K | Hue |
|---|---|---|---|
| 74 | 2-amino-4-(N-methyl-N-X-aminomethyl)benzenesulphonic acid structure | 8-(NH-Z¹)-1-hydroxy-2-methyl-naphthalene-3,6-disulphonic acid structure | Red |
| 75 | 2-amino-5-(X-NH-CH₂)-naphthalene-1-sulphonic acid structure | 8-(NH-Z¹)-1-hydroxy-2-methyl-naphthalene-3,6-disulphonic acid structure | Bluish red |
| 76 | 2-amino-5-(X-NH)-benzenesulphonic acid structure | 8-(NH-Z¹)-1-hydroxy-2-methyl-naphthalene-3,6-disulphonic acid structure | Red-violet |
| 77 | 2-amino-5-(X-NH)-benzenesulphonic acid structure | 6-(NH-Z¹)-1-hydroxy-2-methyl-naphthalene-3-sulphonic acid structure | Bright red |
| 78 | 2-amino-4-(N-methyl-N-X-aminomethyl)benzenesulphonic acid structure | " | Orange |
| 79 | 2-amino-4-(X-NH)-benzenesulphonic acid structure | " | Orange |
| 80 | 2-amino-4-(X-NH)-benzenesulphonic acid structure | 6-(N-methyl-N-Z¹-amino)-1-hydroxy-2-methyl-naphthalene-3-sulphonic acid structure | Orange |

EXAMPLE 81

0.26 mol of 3-(2-sulphatoethyl)sulphonyl-aniline is dissolved in 250 ml of water under neutral conditions using 1-molar sodium bicarbonate solution. 250 g of ice are added, and 0.27 mol of cyanuric fluoride is added dropwise. The pH is maintained at 4–5 with 1-molar sodium bicarbonate solution.

Stirring is continued for 10 minutes.

0.2 mol of 8-(4'-amino-benzoylamino)-1-naphthol-3,6-disulphonic acid is stirred in 300 ml of water and dissolved under neutral conditions with 11% strength lithium hydroxide solution. This solution is added to the above condensation solution. The pH is maintained at 6.5–7 with sodium carbonate solution, and the temperature increases to about 10° C. After reaction is complete, 0.2 mol of the diazonium salt from Example 1 is added, and the pH is simultaneously maintained at 7.5–8 by dropwise addition of sodium carbonate solution (20 g/100 ml). After 3 hours, the product is salted out with NaCl, isolated and dried. The dyestuff obtained of the formula

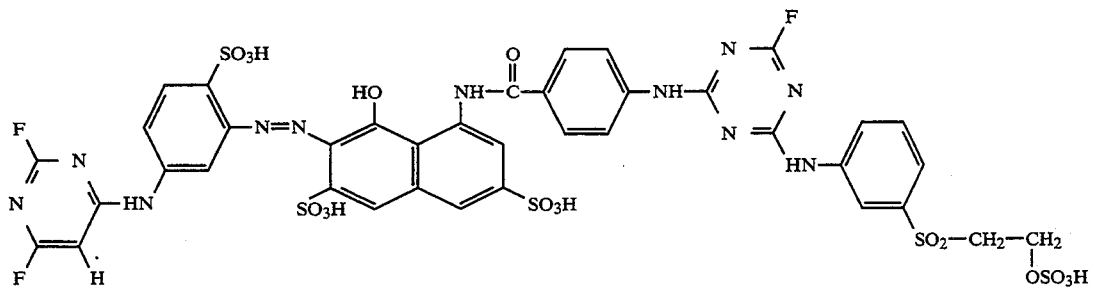
dyes cotton in red hues.
The dyestuffs of Examples 81–90 are obtained analogously using the corresponding diazo components, coupling components and amines. They have the general formula
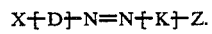

| Ex. | Diazo component | Coupling component | Z | Hue |
|---|---|---|---|---|
| 81a | 2-amino-1-sulfo-4-(X-NH)-benzene | 1-hydroxy-3-methyl-6-(NH-Z)-naphthalene-2-sulfonic acid | 2-methyl-4-fluoro-6-(3-(SO₂CH₂CH₂OSO₃H)-phenylamino)-1,3,5-triazine | Bright red |
| 82 | 2-amino-1-sulfo-4-(X-N(CH₃)-CH₂-)-benzene | " | " | Orange |
| 83 | 2-amino-1-sulfo-4-(X-NH)-benzene | 8-amino-1-hydroxy-3-methyl-6-(NH-Z)-naphthalene-2,? -sulfonic acid (NH-Z at 8, SO₃H at 6) | 2-methyl-4-fluoro-6-(4-(SO₂-CH=CH₂)-phenylamino)-1,3,5-triazine | Red λmax = 515 nm, sh 535 nm |
| 84 | 2-amino-1-sulfo-4-(X-NH)-benzene | 8-amino-1-hydroxy-3-methyl-6-SO₃H-naphthalene with NH-Z | 2-methyl-4-fluoro-6-(3-(SO₂CH₂CH₂OSO₃H)-phenylamino)-1,3,5-triazine | Red |

-continued

| Ex. | Diazo component | Coupling component | Z | Hue |
|---|---|---|---|---|
| 85 | 2-amino-4-(X-N(CH₃)-CH₂-)benzenesulfonic acid (SO₃H, NH₂, X-N-CH₂-CH₃) | 8-amino-1-hydroxy-7-methyl-naphthalene-3,6-disulfonic acid type (NH-Z, OH, SO₃H, HO₃S, CH₃) | 4-(SO₂-CH₂CH₂-O-SO₃H)phenyl-NH- triazinyl (F, N, N, N, CH₃) | Red |
| 86 | 2-amino-4-(X-N(CH₃)-CH₂-)benzenesulfonic acid | " | 3-(SO₂CH₂CH₂OSO₃H)phenyl-NH- triazinyl (F) | Red |
| 87 | 2-amino-1-sulfo-5-(X-NH-CH₂-)naphthalene (SO₃H, NH₂, X-NH-CH₂) | " | 4-(SO₂CH₂CH₂OSO₃H)phenyl-NH- triazinyl (F) | Red |
| 88 | 2-amino-1-sulfo-5-(X-NH-CH₂-)naphthalene | " | " | Bluish red |
| 89 | 2-amino-4-(X-NH-)benzenesulfonic acid (SO₃H, NH₂, X-NH) | 4-(NH-Z)phenyl-O-CO-NH- naphthalene with OH, SO₃H, SO₃H, CH₃ | " | Red |

-continued

| Ex. | Diazo component | Coupling component | Z | Hue |
|---|---|---|---|---|
| 90 | ![diazo: benzene with SO3H, NH2, X—N(CH3)—CH2] | ![coupling: naphthalene with OH, NH-CO-, SO3H, SO3H, CH3, linked to phenyl-NH-Z] | ![triazine with F, NH-phenyl-SO2CH2CH2OSO3H, isopropyl-N] | Red |

EXAMPLE 91 a) 0.2 mol of 2-amino-4-(aminomethyl)-benzenesulphonic acid is dissolved in 500 ml of water at a pH of 8 using conc. sodium hydroxide solution. 0.25 mol of 2,4,6-trifluoropyrimidine is added. The pH is maintained at 8–8.5 by simultaneous addition of 11% strength lithium hydroxide solution. T=30° C.–40° C. The mixture is cooled to 0° C., and 56 ml of 30% strength hydrochloric acid are added.

47 ml.of sodium nitrite solution (30 g/100 ml) are added dropwise over a period of 1 hour. The diazonium salt solution is stirred at 0–5° C. for another hour. Excess nitrite is then destroyed by addition of sulphamic acid.

b) 0.2 mol of 1-amino-8-hydroxynaphthalene-4,6-disulphonic acid is dissolved in 300 ml of water at a pH of 5–7 by addition of conc. sodium hydroxide solution. 300 g of ice are added, and 0.21 mol of cyanuric chloride is sprinkled in. The pH is maintained at 4–4.5 at 0° C. using sodium carbonate solution (20 g/100 ml). After condensation is complete, 0.2 mol of a neutral solution of 4-chloroaniline in about 200 ml of water is added. The mixture is heated to 20°–30° C., and the pH is maintained at 6–7 with sodium carbonate solution (20 g/100 ml). After about 1 hour, the mixture is cooled to 10° C., and the above diazonium salt solution a) is added. At the same time, the pH is maintained at 7–7.5 with sodium carbonate solution (20 g/100 ml).

After coupling is complete, the product is salted out with NaCl, isolated and dried. The dyestuff obtained of the formula

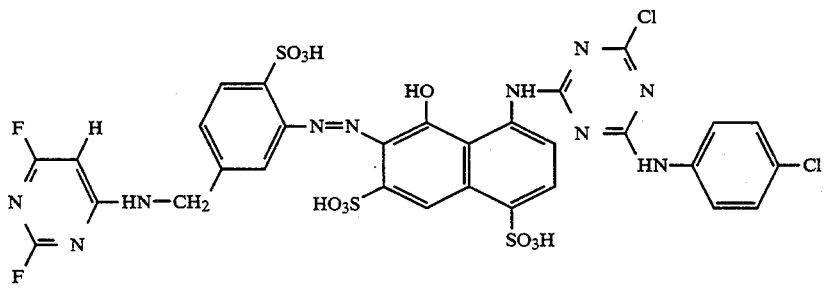

dyes cotton in red hues.

By varying the diazo components, coupling components and amines, the dyestuffs of Examples 92–111 below of the general formula $$X\!-\!\!\left[D\right]\!-\!N\!=\!N\!-\!\left[K\right]\!-\!Z$$

are obtained. They dye cotton in the hues given.

| Ex. | Diazo component | Coupling component | Z | Hue |
|---|---|---|---|---|
| 92 | 4-(X-NH)-2-amino-1-sulfophenyl | 4-amino-5-hydroxy-2,7-disulfo-6-methylnaphthalene (NH-Z, OH) | 4-chloro-6-isopropyl-1,3,5-triazin-2-yl-NH-C6H4-SO2CH2CH2OSO3H | Yellowish red |
| 93 | 4-(X-N(CH3)-CH2)-2-amino-1-sulfophenyl | same | same | Yellowish red |
| 94 | 5-(X-HN-CH2)-2-amino-1-sulfonaphthalene | same | same | Red |
| 95 | 4-(X-NH)-2-amino-1-sulfophenyl | same | 4-chloro-6-isopropyl-1,3,5-triazin-2-yl-NH-C6H4-SO3H (meta) | Yellowish red |

| Ex. | Diazo component | Coupling component | Z | Hue |
|---|---|---|---|---|
| 96 | 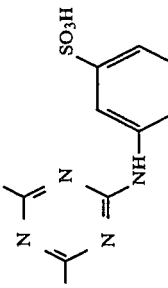 | 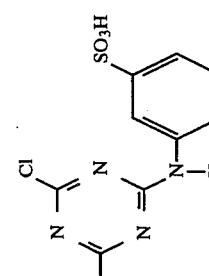 | 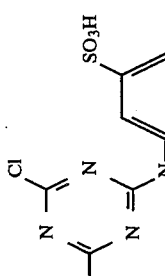 | Red |
| 97 | 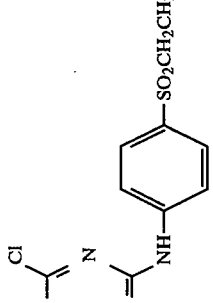 | 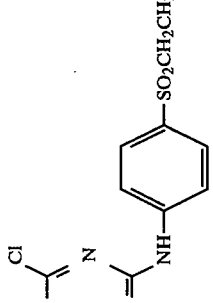 | 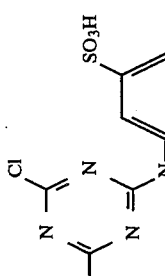 | Yellowish red |
| 98 | 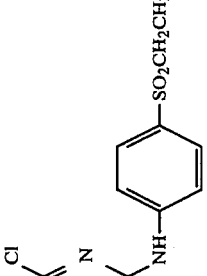 | 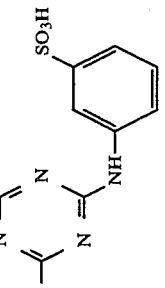 | | Red |
| 99 | | | | Red |

-continued

| Ex. | Diazo component | Coupling component | Z | Hue |
|---|---|---|---|---|
| 100 | naphthalene with SO₃H, NH₂, X—HN—CH₂ substituents | naphthalene with NH—Z, OH, SO₃H, SO₃H, CH₃ substituents | triazine with Cl, CH₃, NH—(p-phenylene)—SO₂CH₂CH₂OSO₃H | Bluish red |
| 101 | benzene with NH₂, SO₃H, X—NH substituents | naphthalene with NH—Z, OH, SO₃H, SO₃H, CH₃ substituents | triazine with Cl, CH₃, NH—(m-phenylene)—SO₂CH₂CH₂OSO₃H | Red |
| 102 | benzene with NH₂, SO₃H, X—NH substituents | naphthalene with NH—Z, OH, SO₃H, HO₃S, CH₃ substituents | triazine with Cl, CH₃, NHCH₂CH₂SO₃H | Red |
| 103 | naphthalene with SO₃H, NH₂, X—NH—CH₂ substituents | naphthalene with NH—Z, OH, SO₃H, HO₃S, CH₃ substituents | triazine with Cl, CH₃, NH—(o-phenylene)—SO₂CH₂CH₂OSO₃H | Red |

-continued

| Ex. | Diazo component | Coupling component | Z | Hue |
|---|---|---|---|---|
| 104 | 2-amino-1-sulfo-5-(X-HN-CH₂)-naphthalene | 8-amino-1-hydroxy-2-methyl-naphthalene-3,6-disulfonic acid with NH-Z at 8 | 2-chloro-6-methyl-4-[(2,5-disulfophenyl)NH]-triazine | Bluish red |
| 105 | 2-amino-4-(X-NH)-benzenesulfonic acid | 8-(4-NH-Z-phenyl-CO-NH)-1-hydroxy-naphthalene-3,6-disulfonic acid | 2-chloro-6-methyl-4-[N(CH₃)(CH₂CH₂SO₃H)]-triazine | Red |
| 106 | 2-amino-1-sulfo-5-(X-NH-CH₂)-naphthalene | 8-(4-NH-Z-phenyl-CO-NH)-1-hydroxy-naphthalene-3,6-disulfonic acid | 2-chloro-6-methyl-4-morpholino-triazine | Red |
| 107 | 2-amino-4-(X-NH)-benzenesulfonic acid | 6-NH-Z-1-hydroxy-2-methyl-naphthalene-3-sulfonic acid | 2-chloro-6-methyl-4-[(3-SO₂CH₂CH₂OSO₃H-phenyl)NH]-triazine | Bright red |

-continued

| Ex. | Diazo component | Coupling component | Z | Hue |
|---|---|---|---|---|
| 108 | 2-amino-4-(N-methyl-N-CH₂-X)benzene-1-sulfonic acid structure | 1-hydroxy-2-methyl-6-(NH-Z)naphthalene-3-sulfonic acid | 4-chloro-6-isopropyl-1,3,5-triazin-2-yl-NH-[3-(SO₂CH₂CH₂OSO₃H)phenyl] | Orange |
| 109 | 2-amino-4-(X-HN)benzene-1-sulfonic acid | 1-hydroxy-2-methyl-6-(NH-Z)naphthalene-3-sulfonic acid | 4-chloro-6-methyl-1,3,5-triazin-2-yl-NH-[4-(SO₃H)phenyl] | Orange |
| 110 | 2-amino-4-(X-NH)benzene-1-sulfonic acid | 1-hydroxy-2-methyl-6-(N(CH₃)-Z)naphthalene-3-sulfonic acid | 4-chloro-6-isopropyl-1,3,5-triazin-2-yl-N(Et)-phenyl | Orange |
| 111 | 2-amino-4-(N-methyl-N-CH₂-X)benzene-1-sulfonic acid | 1-hydroxy-2-methyl-6-(N(CH₃)-Z)naphthalene-3-sulfonic acid | 4-chloro-6-isopropyl-1,3,5-triazin-2-yl-NH-[3-(SO₂CH₂CH₂OSO₃H)phenyl] | Orange |

EXAMPLE 112

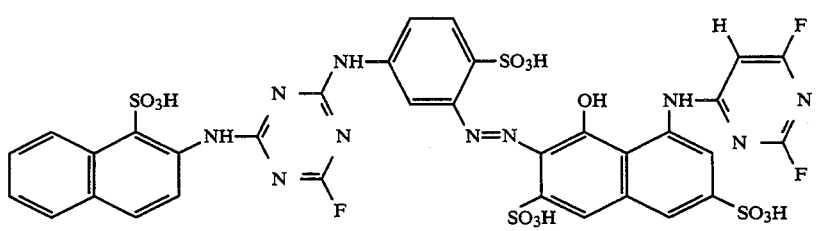

0.2 mol of 2-aminonaphthalenesulphonic acid is dissolved in 280 ml of water at a pH of 7 using lithium hydroxide, and 250 g of ice are added. 0.21 mol of cyanuric fluoride is then added, and the pH is maintained at about 4 with sodium carbonate solution. A neutral solution of 2,4-diaminobenzenesulphonic acid is added to the suspension thus formed, and the pH is raised to 7-7.5. The reaction temperature is increased to 20° C., and the reaction mixture is stirred for about 1 hour. It is then cooled to 0° C. and diazotised at a pH of 2-2.2 with HCl and sodium nitrite solution. After excess nitrite has been destroyed with sulphamic acid, the product is coupled onto the coupling component described in Example 32 at a pH of 7-8 and 10°-15° C. The product is salted out, isolated and dried to give the dyestuff of the formula which dyes cotton in red hues.

The dyestuffs of Examples 113–124 of the general formula

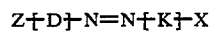

can be prepared analogously, using the diazo and coupling components mentioned.

However, in some cases it is more favourable first to synthesise the azo chromophore and then to condense it with the reactive components or one thereof (Z). They dye cotton in the hues mentioned.

X has the meaning given in formula (1).

| Ex. | Diazo component | Coupling component | Z | Hue |
|---|---|---|---|---|
| 113 | | | | Red-violet |
| 114 | | " | " | Red |
| 115 | | " | | Bluish red |
| 116 | | | | Bluish red |
| 117 | | | " | Red |

-continued
| Ex. | Diazo component | Coupling component | Z | Hue |
|---|---|---|---|---|
| 118 | 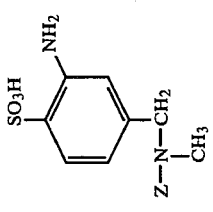 | " | 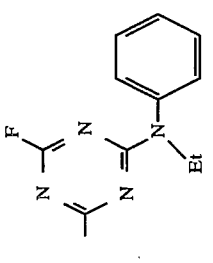 | Red |
| 119 | 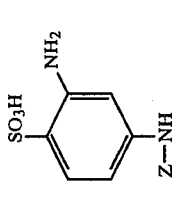 | 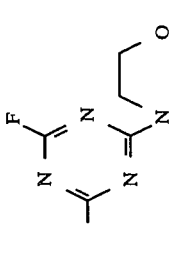 | 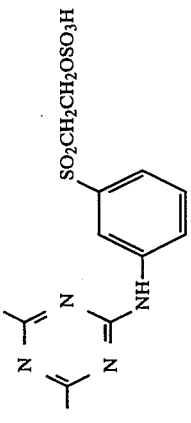 | Red |
| 120 | 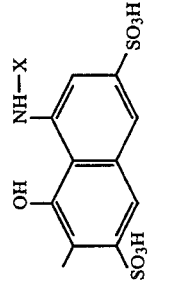 | 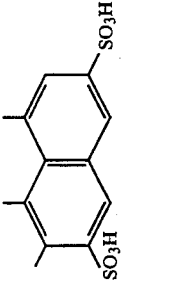 | 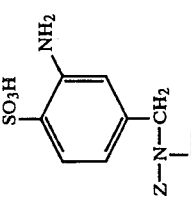 | Red-violet |
| 121 | | " | | Red |

-continued

| Ex. | Diazo component | Coupling component | Z | Hue |
|---|---|---|---|---|
| 122 | 2-amino-naphthalene with SO₃H groups and Z—NH—CH₂ substituent | 8-amino-1-hydroxy-naphthalene-3,6-disulfonic acid derivative with NH—X and methyl | triazine with F, NH-phenyl-SO₂CH₂CH₂SO₃H, methyl | Bluish red |
| 123 | 2-amino-4-(Z—NH)-benzenesulfonic acid | 8-(NH—CO—C₆H₄—NH—X)-1-hydroxy-naphthalene-3,6-disulfonic acid | " | Red |
| 124 | 2-amino-4-(Z—NH)-benzenesulfonic acid | 8-amino-1-hydroxy-naphthalene-3,6-disulfonic acid derivative with NH—X and methyl | triazine with F, NH-(3-SO₂CH₂CH₂OSO₃H-phenyl), methyl | Red |

EXAMPLE 125

0.22 mol of N-ethylaniline is dissolved in 200 ml of water at a pH of 7. 200 g of ice are added, and 0.24 mol of cyanuric chloride is sprinkled in. The pH is maintained at 6–7 with sodium carbonate solution (20 g/100 ml). After about 1 hour at 0° C., condensation is complete. 0.2 mol of 2,4-diamino-benzenesulphonic acid is dissolved in 250 ml of water by addition of conc. sodium hydroxide solution and added to the first step of the condensation. The pH is maintained at 6–7 with sodium carbonate solution (20 g/100 ml). The mixture is heated to 25°–35° C. After condensation is complete, it is cooled to 0° C. 56 ml of 30% strength hydrochloric acid are added. 47 ml of sodium nitrite solution (30 g/100 ml) are added dropwise, and the mixture is stirred at 0° C. for 1 hour. Sodium nitrite is destroyed using sulphamic acid, and the diazonium salt solution thus obtained is added to the coupling component from Example 32. The pH is maintained at 7–8 with sodium carbonate solution (20 g/100 ml). T=10°–15° C. After coupling is complete, the product is salted out with NaCl, isolated and dried. The dyestuff obtained of the formula

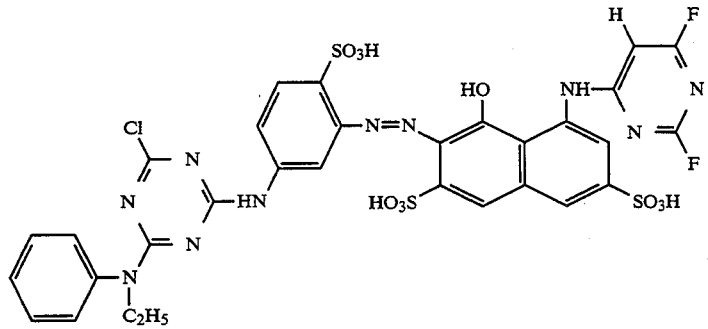

dyes cotton in red hues.

The dyestuffs of Examples 126–131 of the general formula $$Z{+}D{+}N{=}N{+}K{+}X$$

can be prepared analogously by using the corresponding diazo components, coupling components and amines. In some cases, it is more favourable to carry out the condensation with cyanuric chloride and amine at the end of the synthesis sequence.

X has the meaning given in formula (1).

| Ex. | Diazo component | Coupling component | Z | Hue |
|---|---|---|---|---|
| 126 | (structure) | (structure) | (structure) | Red-violet |
| 127 | (structure) | (structure) | (structure) | Bluish red |
| 128 | (structure) | (structure) | (structure) | Bluish red |
| 129 | (structure) | (structure) | (structure) | Red |

-continued

| Ex. | Diazo component | Coupling component | Z | Hue |
|---|---|---|---|---|
| 130 | 2-amino-4-(N-methyl-N-Z-aminomethyl)benzenesulfonic acid | 8-hydroxy-5-(4-aminobenzamido)-7-methyl-naphthalene-3,6-disulfonic acid derivative (NH—X) | 2-chloro-4-methyl-6-[(3-(β-sulfatoethylsulfonyl)phenyl)amino]-1,3,5-triazine | Red |
| 131 | 2-amino-4-(N-methyl-N-Z-aminomethyl)benzenesulfonic acid | 8-hydroxy-6-amino-3-methyl-naphthalene-2-sulfonic acid derivative (NH—X) | 2-chloro-4-methyl-6-[(3-(β-sulfatoethylsulfonyl)phenyl)amino]-1,3,5-triazine | Orange |

Further valuable dyestuffs of the formula $$A'\text{---}[D]\text{---}N=N\text{---}[K]\text{---}A'' \text{ or } [D]\text{---}N=N\text{---}[K]\text{---}A'$$
$$\phantom{[D]\text{---}N=N\text{---}[K]\text{---}}|$$
$$\phantom{[D]\text{---}N=N\text{---}[K]\text{---}}A''$$

are those of Examples 132–143, which can be prepared by known methods, such as, for example, described above, and dye cotton in the hues mentioned.

| Ex. | A' | Diazo component | K | A'' | Hue |
|---|---|---|---|---|---|
| 132 | | | | | Golden yellow |
| 133 | | | " | | Golden yellow |
| 134 | | | | " | Reddish yellow |
| 135 | | | | | Reddish yellow |
| 136 | " | " | | | Bluish red |

| Ex. | A' | Diazo component | K | A" | Hue |
|---|---|---|---|---|---|
| 137 | | | | | Orange |
| 138 | | | | | Violet |
| 139 | " | " | | | Yellow |
| 140 | " | | | " | Golden yellow |
| 141 | | | | | Golden yellow |

-continued
| Ex. | A' | Diazo component | K | A'' | Hue |
|---|---|---|---|---|---|
| 142 |  |  |  | 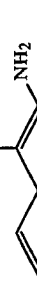 | Golden yellow |
| 143 |  |  | | | Golden yellow |

Analogously to the preparation processes described above or to customary processes, the dyestuffs of Examples 144–169 can be obtained using the corresponding starting components.
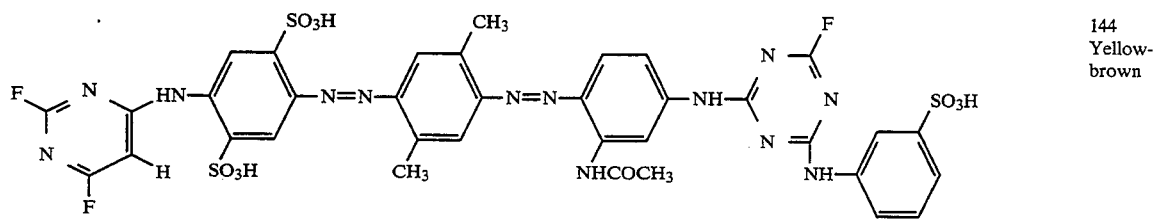
144
Yellow-brown
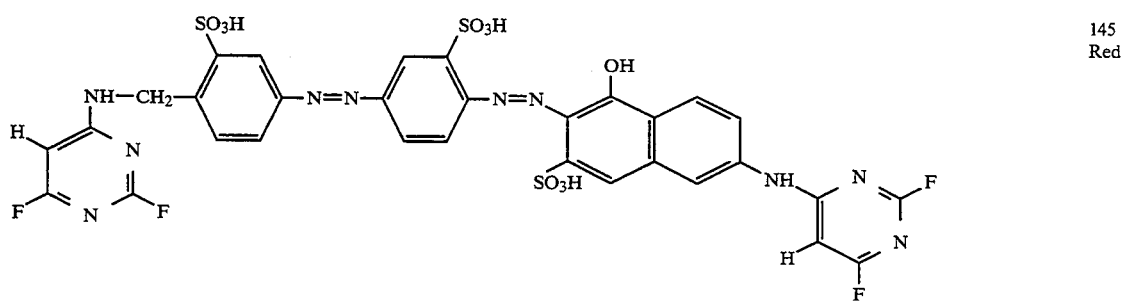
145
Red
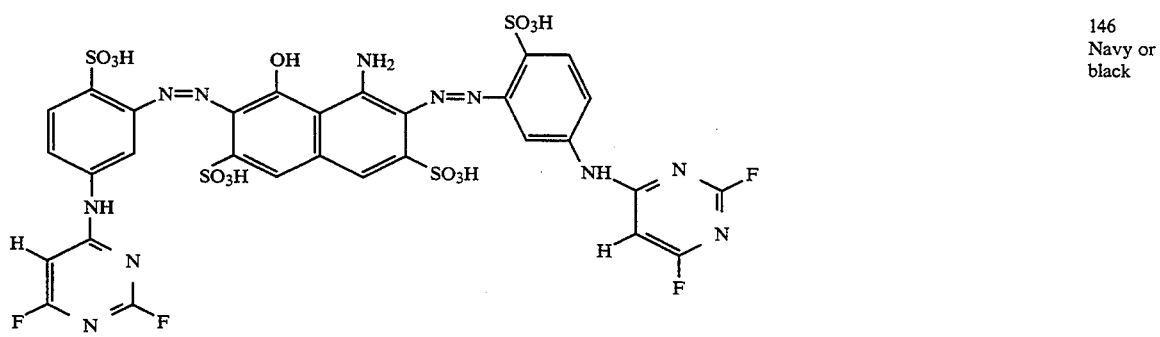
146
Navy or black
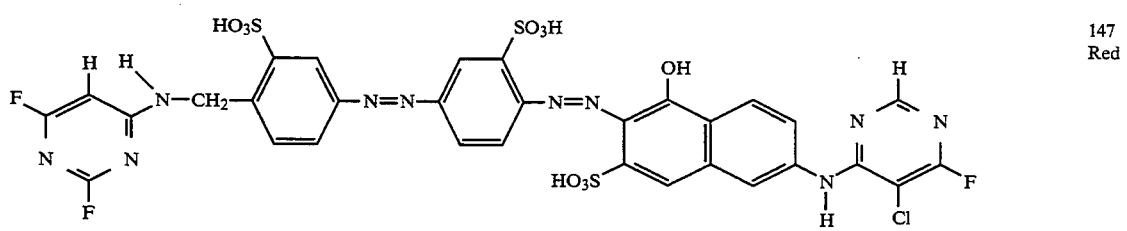
147
Red
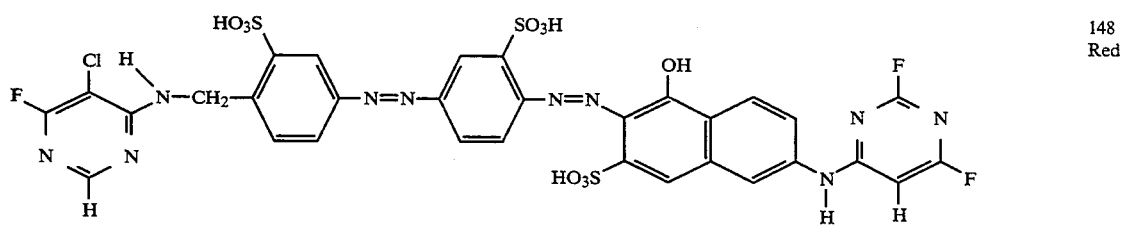
148
Red -continued
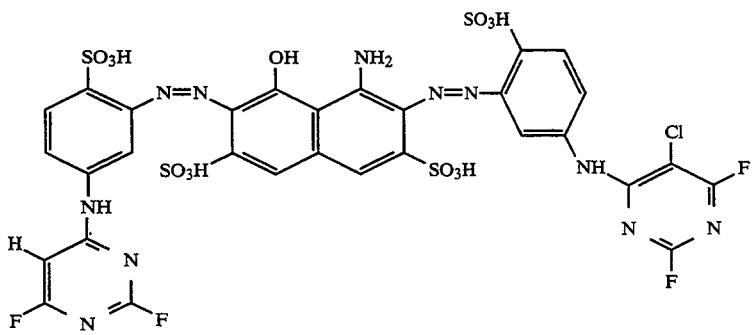
149
Navy or black
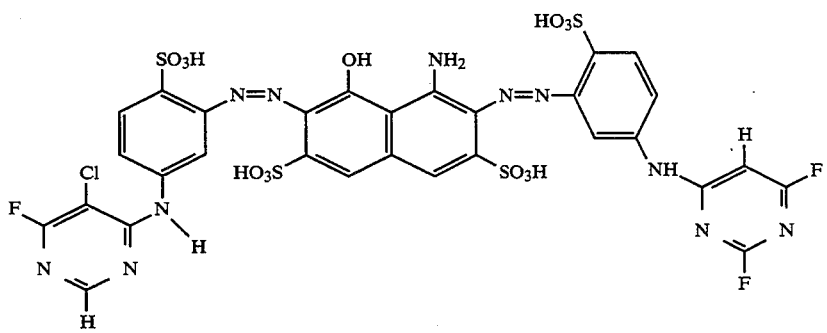
150
Navy or black
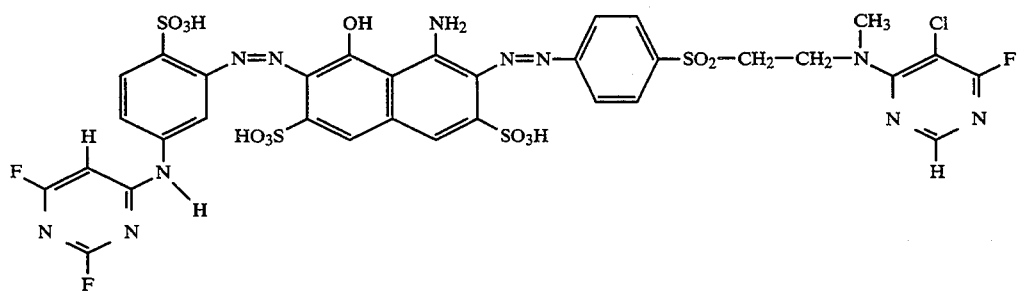
151
Navy
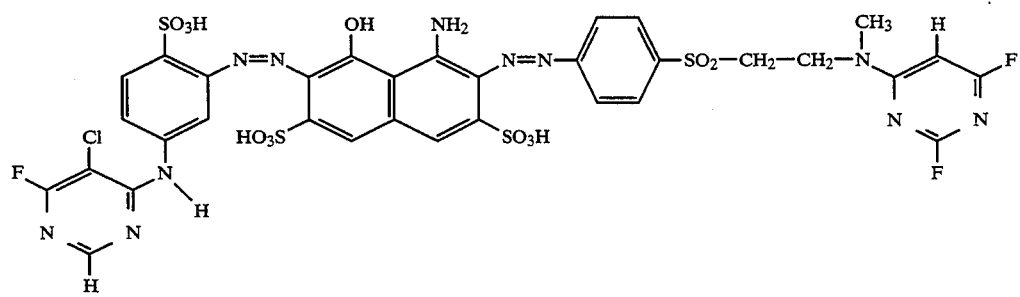
152
Navy
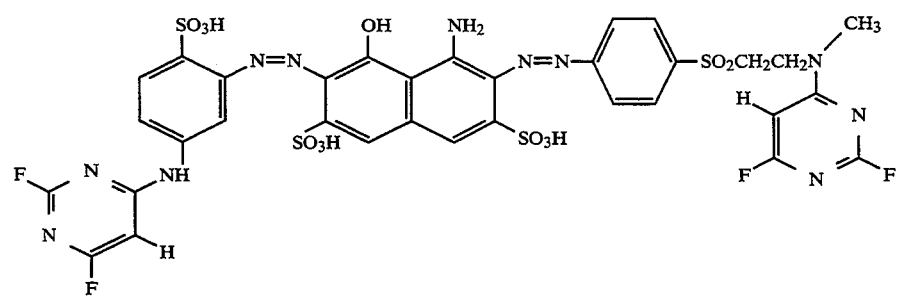
153
Navy -continued
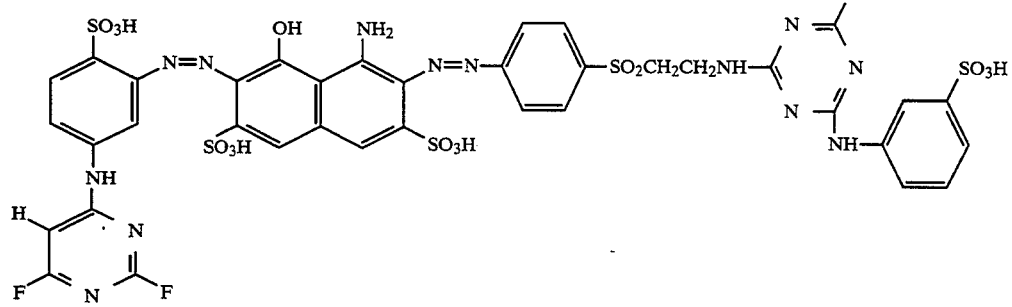
154
Navy
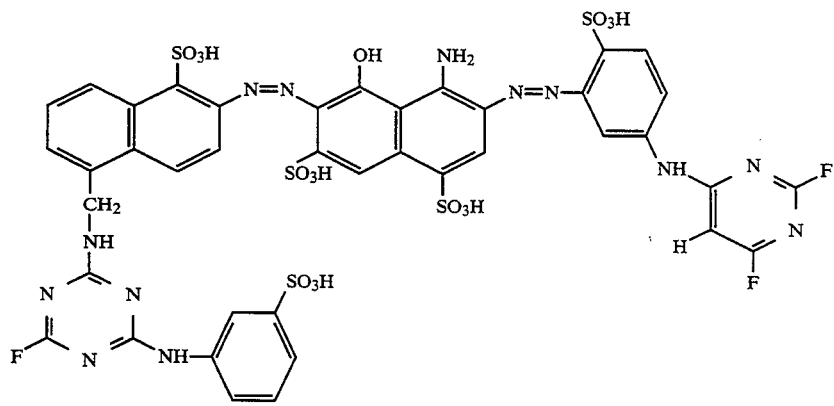
155
Navy
or black
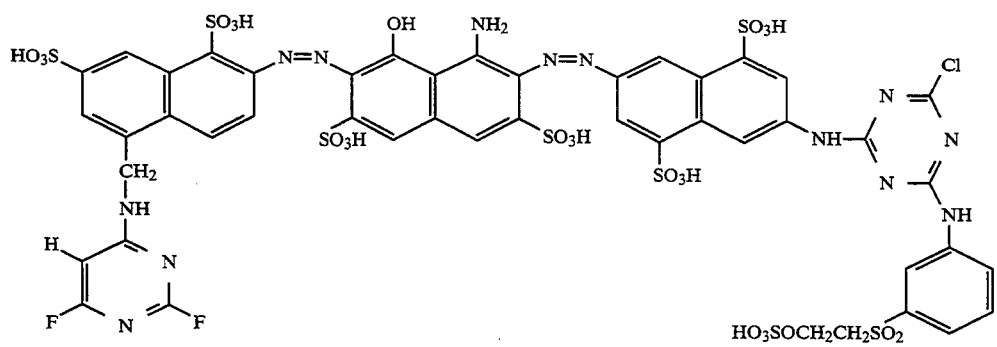
156
Black
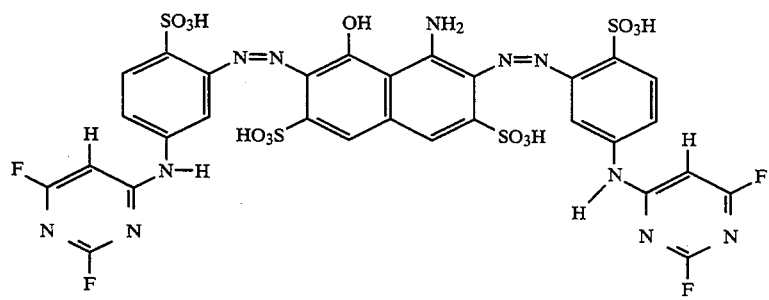
157
Navy
or black
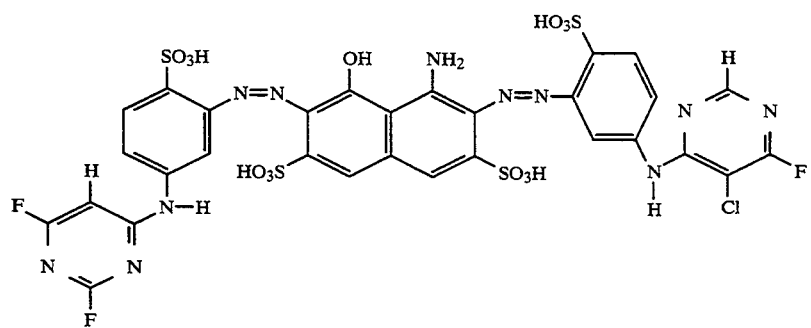
158
Navy
or black

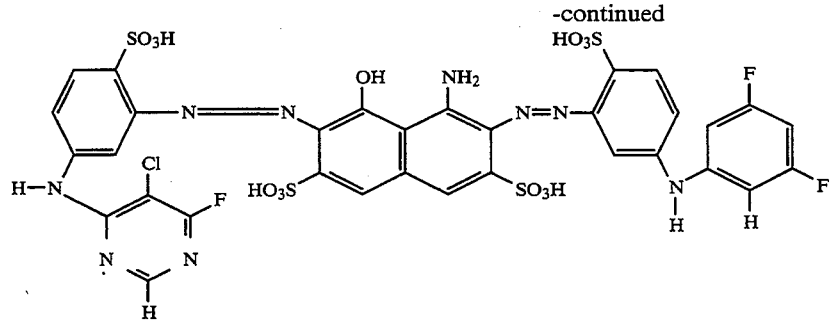
159
Navy or black
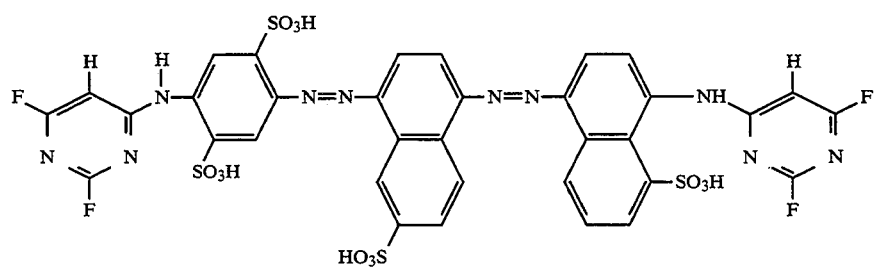
160
Brown
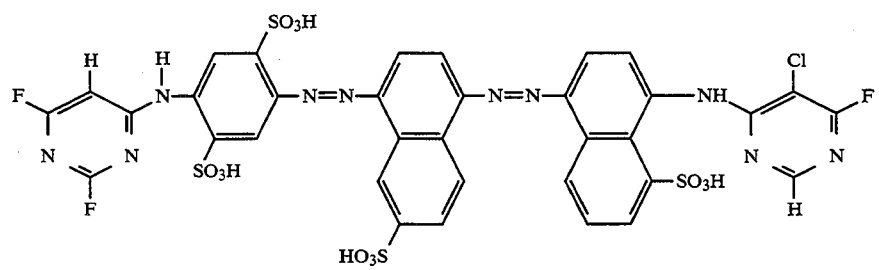
161
Brown
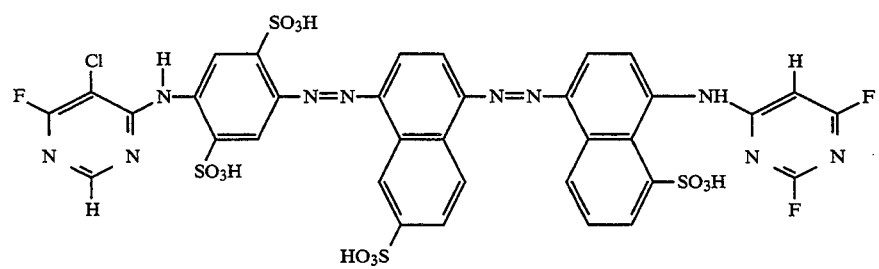
162
Brown
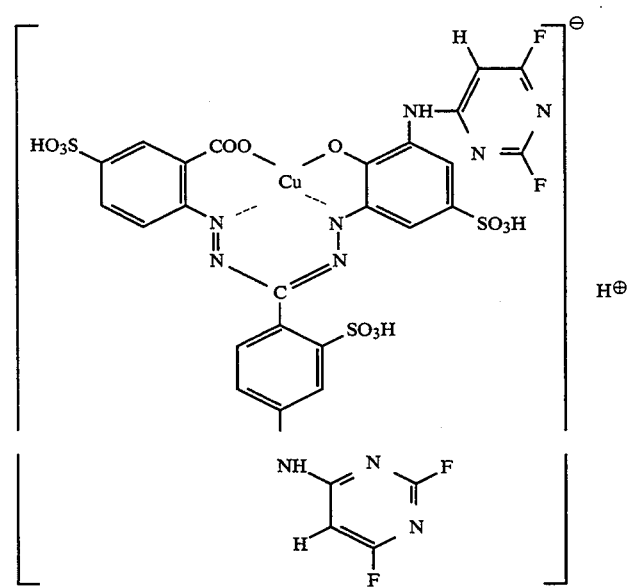
163
Blue -continued
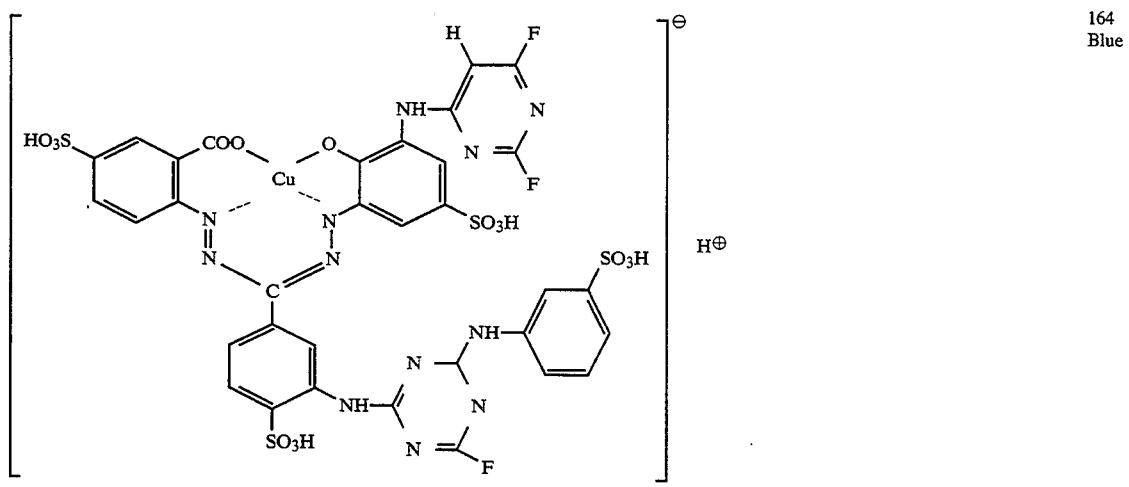 164 Blue
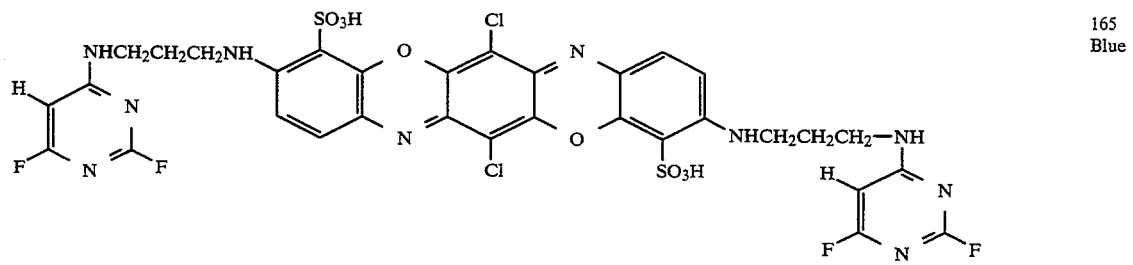 165 Blue
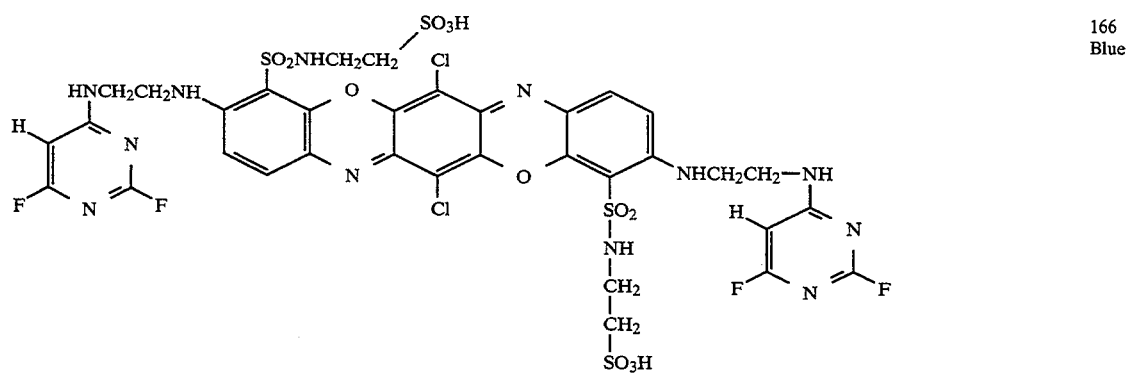 166 Blue
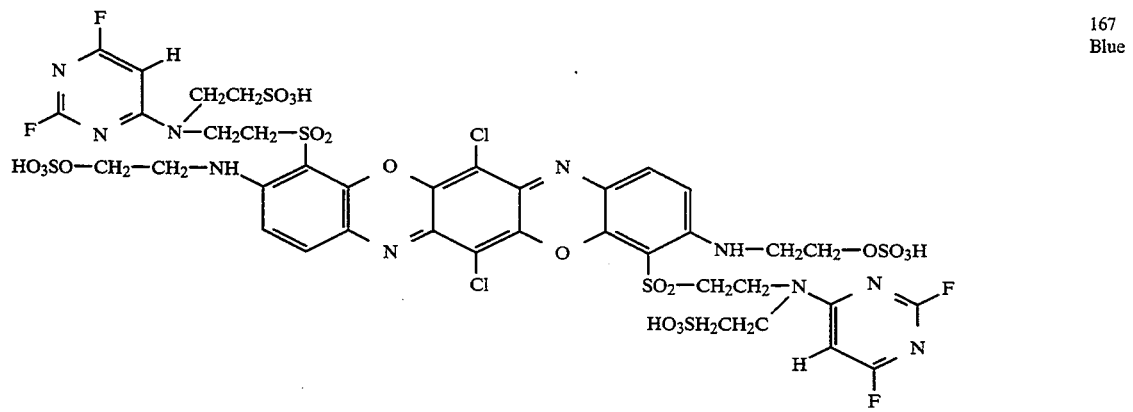 167 Blue 168
Blue 169
Red

We claim:

1. A reactive dyestuff of the formula $$\left[FB\begin{array}{l}-B-NR-X\\-(B^1-NR^1-Z)_{1-2}\end{array}\right] \quad (1)$$

where
FB is the radical of a dyestuff from the mono- or polyazo, metal complex azo, anthraquinone, phthalocyanine, formazan, azomethine, dioxazine, phenazine, stilbene, triphenylmethane, xanthene, thioxanthone, nitroaryl, naphthoquinone, pyrenequinone or perylenetetracarbimide series, B and $B^1$, independently of one another, are a direct bond or a bridging member on a ring C atom of an aromatic-carbocyclic or on a ring C atom or ring N atom of an aromatic-heterocyclic ring in FB, X is Z is a heterocyclic fibre-reactive radical and
R and $R^1$, independently of one another, are H, substituted or unsubstituted $C_1$-$C_6$-alkyl.

2. A dyestuff of claim 1 of the formula $$\left[FB\begin{array}{l}-NR-X\\-(NR^1-Z)_{1-2}\end{array}\right] \quad (1a)$$

in which the individual groups have the meaning given in claim 1.

3. A dyestuff of claim 1 of the formula $$X-\underset{R}{N}-B-[D]-N=N-[K]-B^1-\underset{R^1}{N}-Z \quad (1b)$$

$$Z-\underset{R^1}{N}-B^1-[D]-N=N-[K]-B-\underset{R}{N}-X \quad (1c)$$

$$X-\underset{R}{N}-B-D^1-N=N-[K]-N=N-D^2-B^1-\underset{R^1}{N}-Z \quad (1d)$$

$$Z-\underset{R^1}{N}-B^1-D^1-N=N-[K]-N=N-D^2-B-\underset{R}{N}-X \quad (1e)$$

$$\begin{array}{c}[D]-N=N-[K]-B^1-\underset{R^1}{N}-Z\\ |\\ B\\ |\\ R-N\\ |\\ X\end{array} \quad (1f)$$

in which
—K— in formulae (1d) and (1e) is the radical of a dicoupling component,
D, $D^1$, $D^2$ independently of one another, are the radical of a diazo component from the benzene or naphthalene series,
K is the radical of a coupling component from the benzene, naphthalene, acetoacetic arylide or heterocyclic series.

4. A dyestuff of claim 1, in which Z is a fibre-reactive fluorine-containing 4-pyrimidyl radical or in which Z is

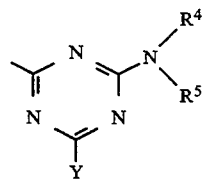

in which $R^4$ and $R^5$, independently of one another, are hydrogen, $C_{1-4}$-alkyl, which is unsubstituted or substituted by halogen, cyano, $C_{1-4}$-alkoxy, hydroxyl, carboxyl, sulpho or sulphato, or are benzyl, phenethyl, cyclohexyl, phenyl or —NHCH$_2$CH$_2$OCH$_2$CH$_2$—SO$_2$M (M is —CH=CH$_2$ or —CH$_2$CH$_2$V where V is a radical which can be eliminated by alkali); phenyl, which is unsubstituted or substituted by halogen, nitro, cyano, trifluoromethyl, sulphamoyl, carbamoyl, $C_{1-4}$-alkyl, $C_{1-4}$-alkoxy, $C_{1-4}$-alkanoylamino, benzoylamino, ureido, hydroxyl, carboxyl, sulphomethyl or sulpho, or are naphthyl, which is unsubstituted or substituted by halogen, nitro, $C_{1-4}$-alkoxy, $C_{1-4}$-alkanoylamino, hydroxyl, carboxyl or sulpho, or in which $R^4$ and $R^5$ together with the amino nitrogen atom form a morpholino, piperidino or piperazino radical and in which Y is Cl, F or a substituted or unsubstituted pyridinium radical.

5. A dyestuff of claim 4,
in which $R^4$ and $R^5$, independently of one another, are hydrogen, $C_{1-4}$-alkyl, which is unsubstituted or substituted by halogen, cyano, $C_{1-4}$-alkoxy, hydroxyl, carboxyl, sulpho or sulphato, or are benzyl, phenethyl, cyclohexyl, phenyl or —NHCH$_2$CH$_2$OCH$_2$CH$_2$—SO$_2$M (M is —CH=CH$_2$ or —CH$_2$CH$_2$V where V is a radical which can be eliminated by alkali); phenyl, which is unsubstituted or substituted by halogen, nitro, cyano, trifluoromethyl, sulphamoyl, carbamoyl, $C_{1-4}$-alkyl, $C_{1-4}$-alkoxy, $C_{1-4}$-alkanoylamino, benzoylamino, ureido, hydroxyl, carboxyl, sulphomethyl or naphthyl, which is unsubstituted or substituted by halogen, nitro, $C_{1-4}$-alkoxy, $C_{1-4}$-alkanoylamino, hydroxyl, carboxyl or sulpho, or in which $R^4$ and $R^5$ together with the amino nitrogen atom form a morpholino, piperidino or piperazino radical and in which Y is Cl.

6. A dyestuff of claim 4,
in which $R^4$ and $R^5$, independently of one another, are hydrogen, $C_{1-4}$-alkyl, which is unsubstituted or substituted by halogen, cyano, $C_{1-4}$-alkoxy, hydroxyl, carboxyl, sulpho or sulphato, or are benzyl, phenethyl, cyclohexyl, phenyl or —NHCH$_2$CH$_2$OCH$_2$CH$_2$—SO$_2$M (M is —CH=CH$_2$ or —CH$_2$CH$_2$V where V is a radical which can be eliminated by alkali); phenyl, which is unsubstituted or substituted by halogen, nitro, cyano, trifluoromethyl, sulphamoyl, carbamoyl, $C_{1-4}$-alkyl, $C_{1-4}$-alkoxy, $C_{1-4}$-alkanoylamino, benzoylamino, ureido, hydroxyl, carboxyl, sulphomethyl or sulpho, or are naphthyl, which is unsubstituted or substituted by halogen, nitro, $C_{1-4}$-alkoxy, $C_{1-4}$-alkanoylamino, hydroxyl, carboxyl or sulpho, or in which $R^4$ and $R^5$ together with the amino nitrogen atom form a morpholino, piperidino or piperazino radical and in which Y is F.

7. A dyestuff of claim 1, in which
Z represents

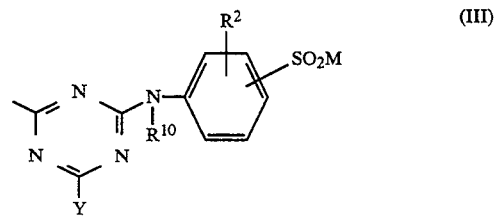

(III)

in which
Y is Cl, F or a substituted or unsubstituted pyridinium radical,
M is CH=CH$_2$ or CH$_2$CH$_2$—V, in which
V is a radical which can be eliminated by alkali and
$R^2$ is H, Cl, Br, $C_1$–$C_4$-alkyl, $C_1$–$C_4$-alkoxy, CO$_2$H or SO$_3$H,
$R^{10}$ is H or substituted or unsubstituted $C_1$–$C_6$-alkyl.

8. A dyestuff of claim 1 of one of the formula

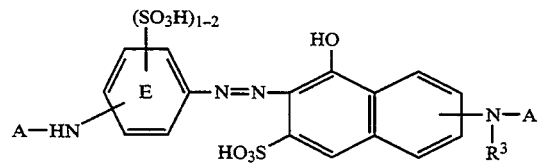

(2)

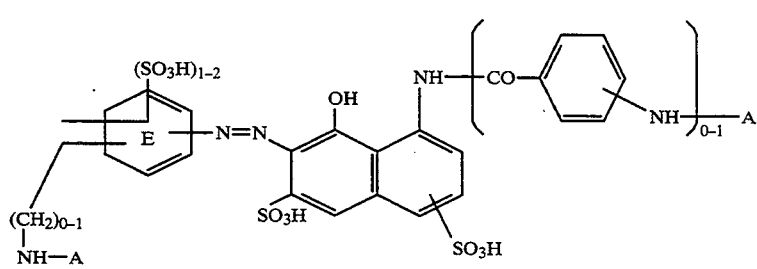

(3)

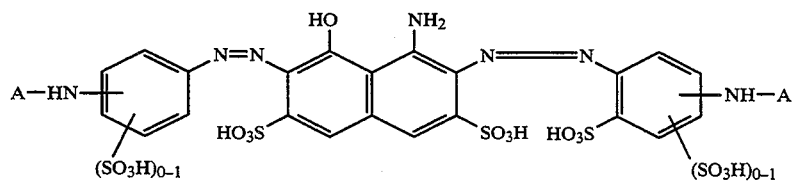
(4)
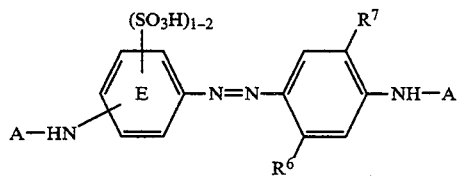
(5)
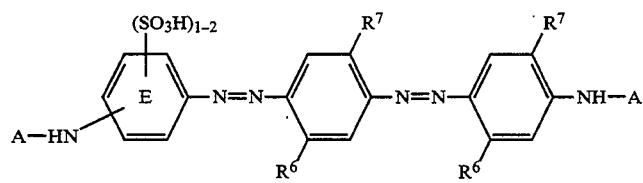
(6)
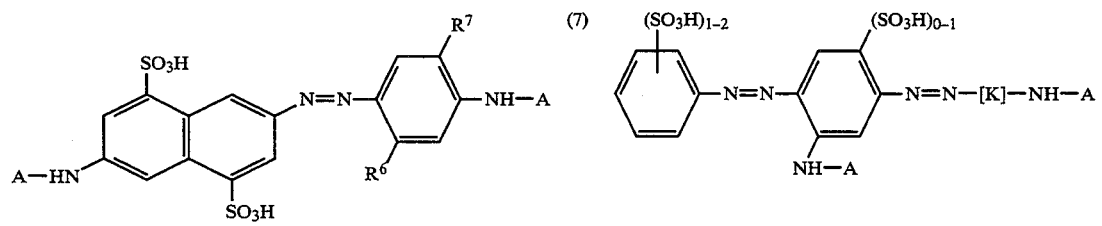
(7) (8)
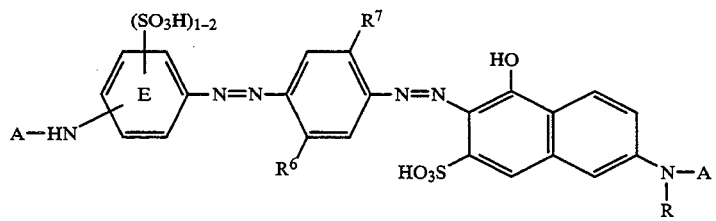
(9)
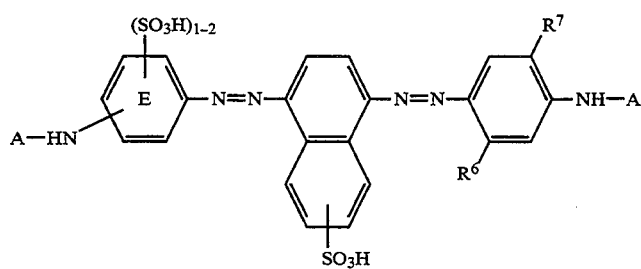
(10)
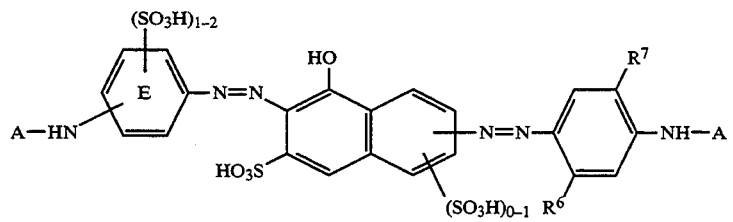
(11)

-continued
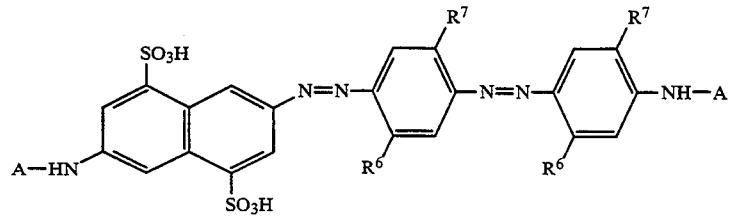
(12)
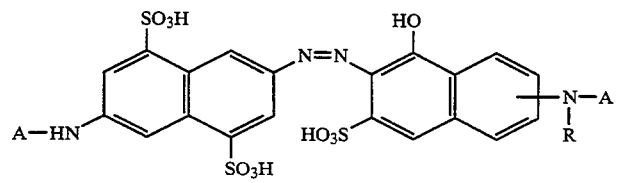
(13)
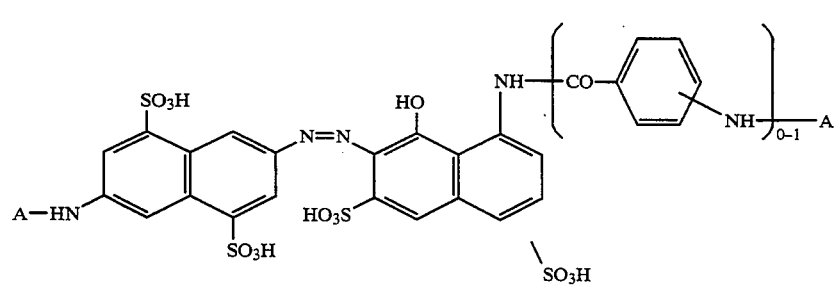
(14)
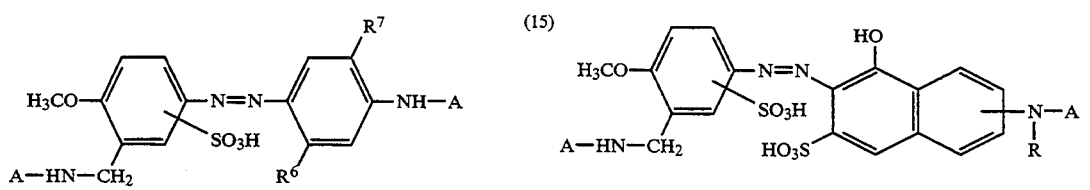
(15) (16)
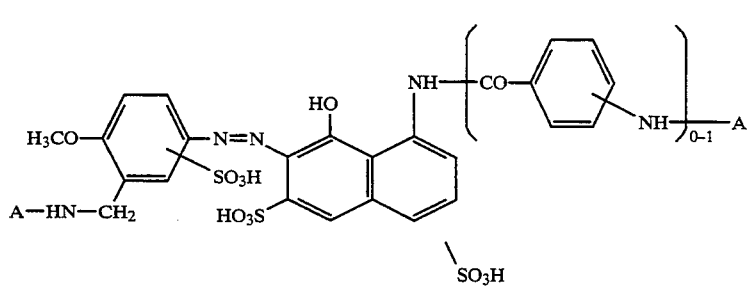
(17)
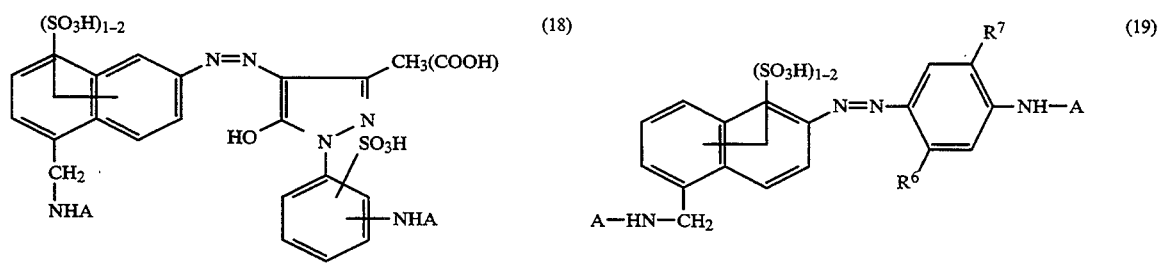
(18) (19)
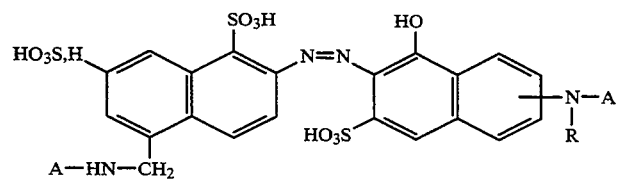
(20)

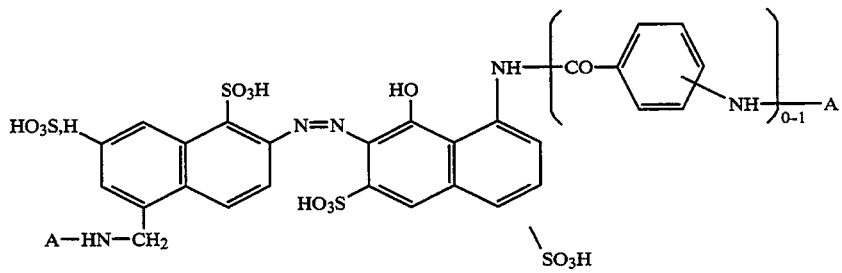
(21)
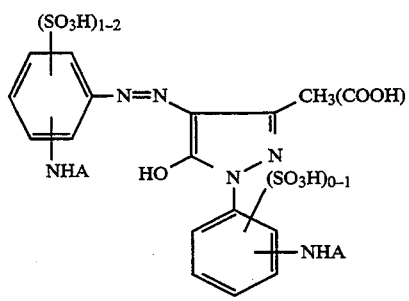
(22)
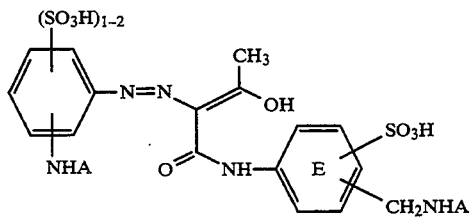
(23)
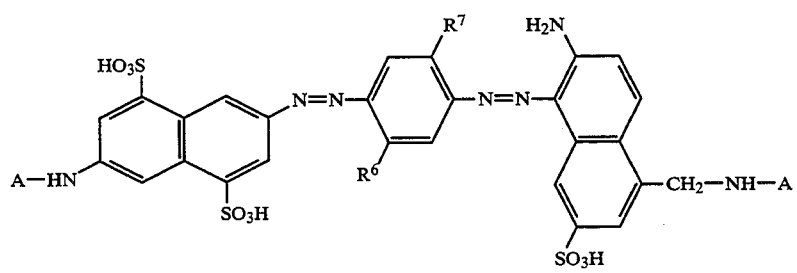
(24)
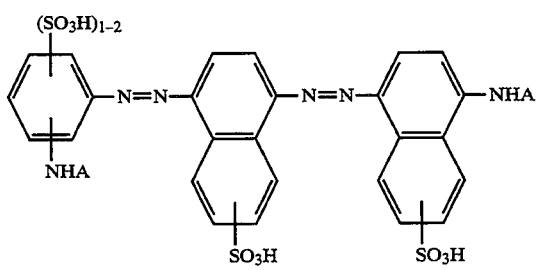
(25)
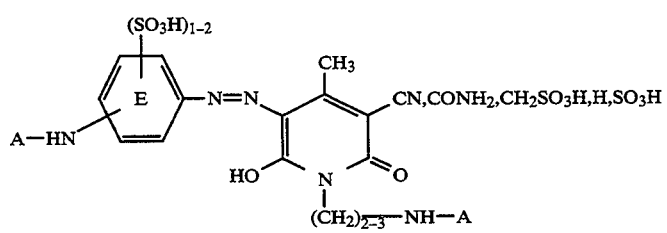
(26)
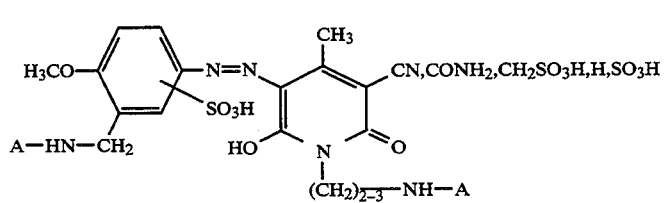
(27)

-continued
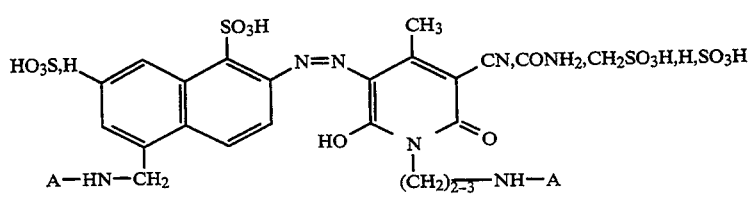
(28)
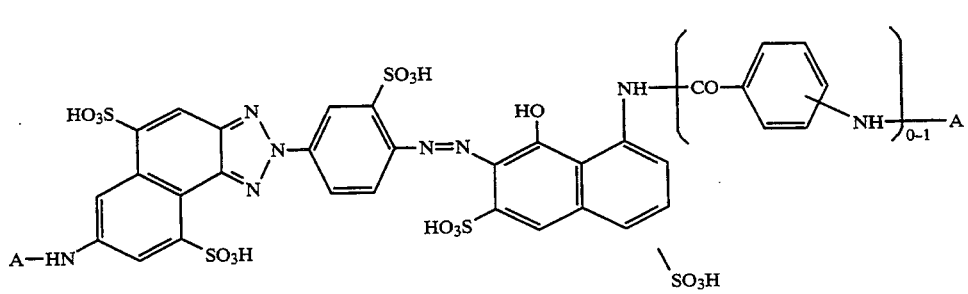
(29)
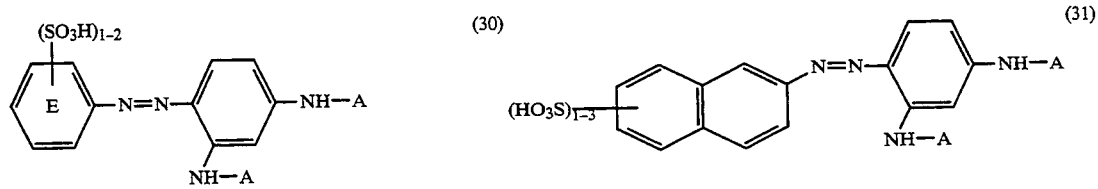
(30) (31)
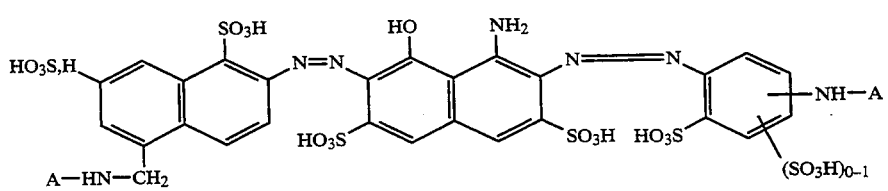
(32)
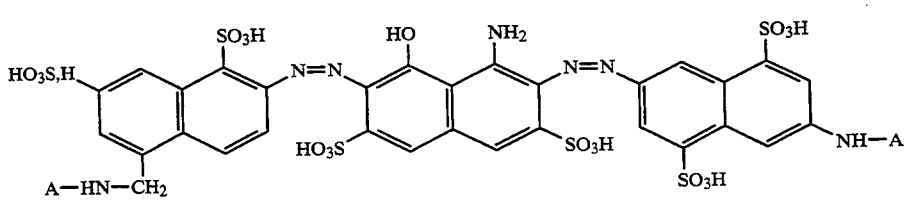
(33)
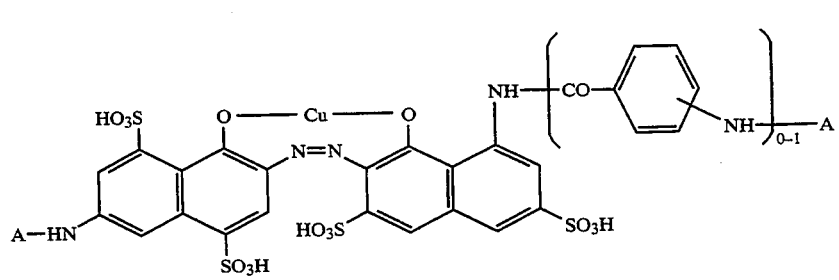
(34)

-continued
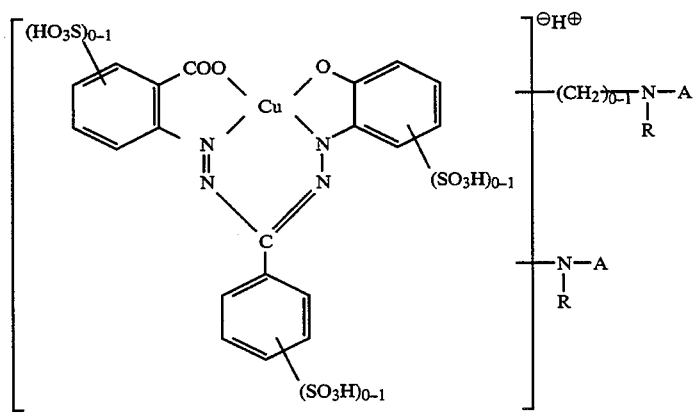
(35)
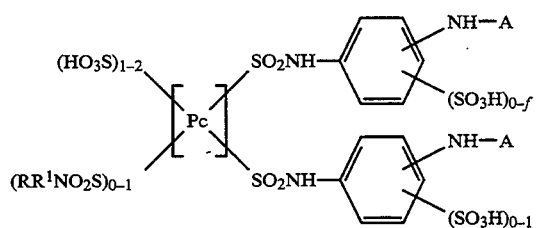
(36)
in which Pc represents a Cu phthalocyanine or an Ni phthalocyanine radical and the total number of substituents on the PC skeleton is at most 4; R and $R^1$ have the abovementioned meaning,
both radicals A have the meaning X according to claim 1 or one A is X and the other A is Z, Z having the meaning given in claim 1,
T is Cl, Br or $OCH_3$,
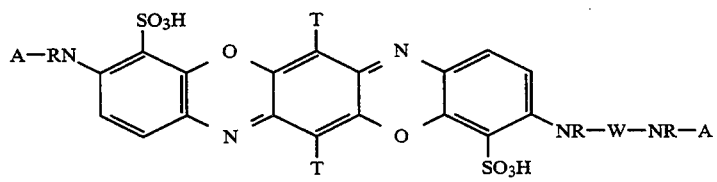
(37)
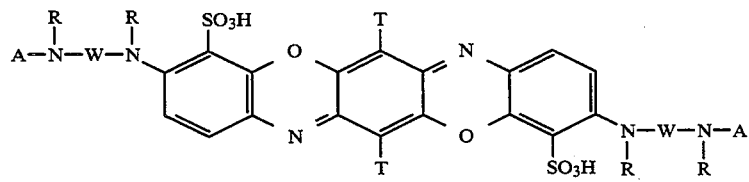
(38)
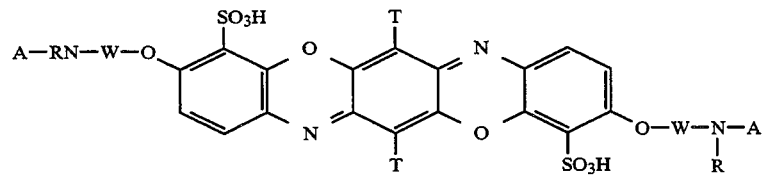
(39)
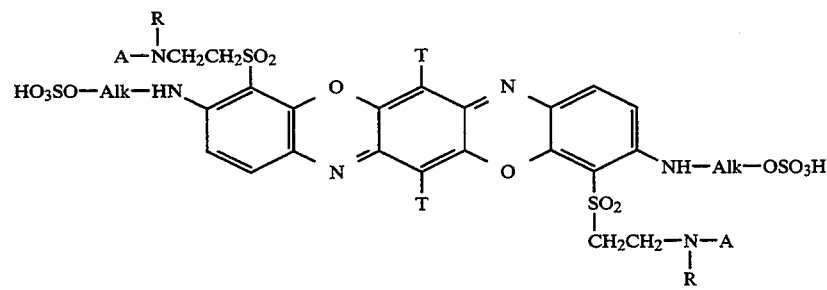
(40)
in which
$R^3$ is H, $CH_3$ or $C_2H_5$ R[6] is H, $C_1$–$C_4$-alkyl, $C_1$–$C_4$-alkoxy, acylamino, $C_1$–$C_4$-alkylsulphonylamino, aminocarbonylamino, substituted or unsubstituted phenylcarbonylamino, Cl, Br R[7] is H, $C_1$–$C_4$-alkyl, $C_1$–$C_4$-alkoxy, OH, $SO_3H$, W is an aliphatic bridging member, Alk is straight-chain or branched $C_1$–$C_6$-alkylene which may be interrupted by hetero atoms or groupings containing hetero atoms such as N, O or S, and in which either both A are X or one A represents X and the other A represents Z.

9. A dyestuff of claim 6 of the formula

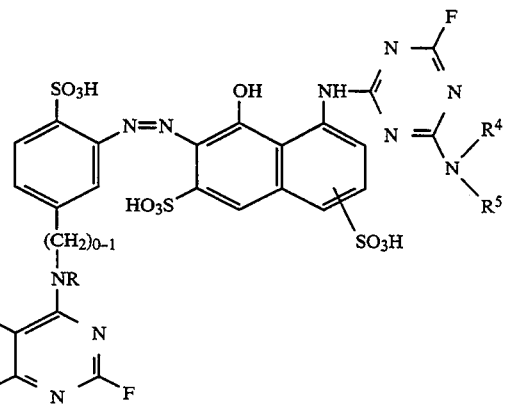

in which R[4] and R[5], independently of one another, are hydrogen, $C_{1-4}$-alkyl, which is unsubstituted or substituted by halogen, cyano, $C_{1-4}$-alkoxy, hydroxyl, carboxyl, sulpho or sulphato, or are benzyl, phenethyl, cyclohexyl, phenyl or —$NHCH_2CH_2OCH_2CH_2$—$SO_2M$ (M is —CH=$CH_2$ or —$CH_2CH_2$—V where V is a radical which can be eliminated by alkali); phenyl, which is unsubstituted or substituted by halogen, nitro, cyano, trifluoromethyl, sulphamoyl, carbamoyl, $C_{1-4}$-alkyl, $C_{1-4}$-alkoxy, $C_{1-4}$-alkanoylamino, benzoylamino, ureido, hydroxyl, carboxyl, sulphomethyl or sulpho, or are naphthyl, which is unsubstituted or substituted by halogen, nitro, $C_{1-4}$-alkoxy, $C_{1-4}$-alkanoylamino, hydroxyl, carboxyl or sulpho, or in which R[4] and R[5] together with the amino nitrogen atom form a morpholino, piperidino or piperazino radical and in which R represents H, $CH_3$ and $C_2H_5$.

* * * * *